US005361476A

United States Patent [19]

Leopold

[11] Patent Number: 5,361,476

[45] Date of Patent: Nov. 8, 1994

[54] METHOD OF MAKING A SPACER FRAME ASSEMBLY

[75] Inventor: Edmund A. Leopold, Hudson, Ohio

[73] Assignee: Glass Equipment Development, Inc., Twinsburg, Ohio

[21] Appl. No.: 204,775

[22] Filed: Mar. 2, 1994

Related U.S. Application Data

[63] Continuation of Ser. No. 929,330, Aug. 13, 1992, Pat. No. 5,295,292.

[51] Int. Cl.[5] .............................................. B23P 17/00

[52] U.S. Cl. ........................................ 29/417; 29/412; 29/458; 156/109; 156/244.18; 156/244.23

[58] Field of Search ................. 29/412, 417, 458, 897, 29/897.34; 72/181, 178; 156/109, 244.18, 244.23; 52/726.1, 790, 656.1, 656.2

[56] References Cited

U.S. PATENT DOCUMENTS 1,877,336 9/1932 Lovell et al. .
2,173,664 9/1939 Shutts .
2,235,680 3/1941 Haven et al. .
2,348,307 5/1944 Richardson .
2,587,063 2/1952 Petsch .
2,625,717 1/1953 Wampler et al. .
2,750,637 6/1956 Browne .
2,768,475 10/1956 Seelen et al. .
2,996,161 8/1961 Etling .
3,021,243 2/1962 Betage .
3,026,582 3/1962 Bayer .
3,030,673 4/1962 London .
3,045,297 7/1962 Ljungdahl .

(List continued on next page.)

FOREIGN PATENT DOCUMENTS 3715 8/1979 European Pat. Off. .............. 52/790
132516 4/1984 European Pat. Off. .
305352 8/1987 European Pat. Off. .
475213 8/1991 European Pat. Off. .
2417480 2/1979 France .
2428728 6/1979 France .
2449222 2/1980 France .
2923769 3/1980 Germany .
349875 6/1931 United Kingdom .
1509178 5/1975 United Kingdom .
2072249 9/1981 United Kingdom .
2104139 3/1983 United Kingdom .................. 52/790

OTHER PUBLICATIONS

Technical Report dated May 1988 by M. Glover & G. Reichert of Edgetech I. G. Ltd. entitled "Super Spacer."

(List continued on next page.)

*Primary Examiner*—Mark Rosenbaum
*Assistant Examiner*—David P. Bryant
*Attorney, Agent, or Firm*—Watts, Hoffmann, Fisher & Heinke

[57] ABSTRACT

A method of making a spacer frame assembly including the steps of providing a supply of thin, flexible relatively narrow sheet metal ribbon stock, feeding the ribbon stock endwise to a first forming station, stamping the ribbon stock to form spacer frame corner structures at the first forming station by defining zones of weakness at frame corner locations spaced along the stock, stopping the movement of stock through the first forming station while stamping, feeding the stock to a second forming station, and roll forming the stock at the second forming station to define a rigid linearly extending frame element having opposite side walls and a base wall, the corner structures disposed at least in part in the opposite channel side walls. The method further includes the steps of severing the frame element to define leading and trailing spacer frame element ends, accumulating stock between the first and second forming stations comprising forming a variable length stock travel path segment, maintaining a substantially continuous movement of the stock through the second forming station, and increasing length of the stock travel path segment when the stock speed through the first forming station is greater than the feeding speed through the second forming station and reducing the length of the stock travel path segment when the feeding speed through the second forming station is greater than the feeding speed through the first station.

10 Claims, 17 Drawing Sheets

U.S. PATENT DOCUMENTS

| | | |
|---|---|---|
| 3,054,153 | 9/1962 | Partsch . |
| 3,105,274 | 10/1963 | Armstrong . |
| 3,212,179 | 10/1965 | Koblensky . |
| 3,267,698 | 8/1966 | Eichhorn et al. . |
| 3,280,523 | 10/1966 | Stroud et al. . |
| 3,283,890 | 11/1966 | Morris et al. . |
| 3,657,900 | 4/1972 | Bowser et al. . |
| 3,919,023 | 11/1975 | Bowser et al. . |
| 3,974,823 | 8/1976 | Patil . |
| 4,015,394 | 4/1977 | Kessler . |
| 4,057,945 | 11/1977 | Kessler . |
| 4,063,002 | 12/1977 | Wilson, Jr. . |
| 4,109,431 | 8/1978 | Mazzoni et al. . |
| 4,222,213 | 9/1980 | Kessler . |
| 4,431,691 | 2/1984 | Greenlee . |
| 4,513,546 | 4/1985 | Gow . |
| 4,520,611 | 6/1985 | Shingu et al. . |
| 4,530,195 | 7/1985 | Leopold . |
| 4,546,723 | 10/1985 | Leopold et al. . |
| 4,622,249 | 11/1986 | Bowser . |
| 4,628,582 | 12/1986 | Leopold . |
| 4,698,891 | 10/1987 | Borys . |
| 4,780,164 | 10/1988 | Rueckheim et al. . |
| 4,807,419 | 2/1989 | Hodek et al. . |
| 4,808,452 | 2/1989 | McShane . |
| 4,831,799 | 5/1989 | Glover et al. . |
| 4,873,803 | 10/1989 | Rundo . |
| 5,018,263 | 5/1991 | Stein . |
| 5,255,481 | 10/1993 | Misera et al. .......................... 52/790 |

OTHER PUBLICATIONS

Advertisement dated Mar. 15, 1990, in Glass Digest for "Versa-Therm" framing system by Tubelite Indahl.

Article dated 1989 in American Society of Heating Refrigerating & Air-Conditioning Engineers Transactions (V. 95, Pt. 2) by J. L. Wright, P. E. & H. F. Sullivan, Ph.D. P. E. entitled Thermal Resistance Measurement of Glazing System Edge-Seals & Seal Materials Using a Guarded Heater Plate Apparatus.

Copy of European Search Report dated Jun. 4, 1993 for European Appln No. EP 93 100 393.3.

Copy of European Search Report dated Jun. 12, 1993 for European Appln No.: EP 93 107877.8.

METHOD OF MAKING A SPACER FRAME ASSEMBLY

This is a continuation of copending U.S. patent application Ser. No. 07/929,330 filed on Aug. 13, 1992, now U.S. Pat. No. 5,295,292.

FIELD OF THE INVENTION

The present invention relates to insulating glass units and more particularly to a method and apparatus for making spacer assemblies used in constructing insulating glass units.

BACKGROUND OF THE INVENTION

Insulating glass units (IGUs) are used in windows to reduce heat loss from building interiors during cold weather. IGUs are typically formed by a spacer assembly sandwiched between glass lights. A spacer assembly usually comprises a frame structure extending peripherally about the unit, a sealant material adhered both to the glass lights and the frame structure, and a desiccant for absorbing atmospheric moisture within the unit. The margins or the glass lights are flush with or extend slightly outwardly from the spacer assembly. The sealant extends continuously about the frame structure periphery and its opposite sides so that the space within the IGUs is hermetic.

There have been numerous proposals for constructing IGUs. One type of IGU was constructed from an elongated corrugated sheet metal strip-like frame embedded in a body of hot melt sealant material. Desiccant was also embedded in the sealant. The resulting composite spacer was packaged for transport and storage by coiling it into drum-like containers. When fabricating an IGU the composite spacer was partially uncoiled and cut to length. The spacer was then bent into a rectangular shape and sandwiched between conforming glass lights.

Perhaps the most successful IGU construction has employed tubular, roll formed aluminum or steel frame elements connected at their ends to form a square or rectangular spacer frame. The frame sides and corners were covered with sealant (e.g., a hot melt material) for securing the frame to the glass lights. The sealant provided a barrier between atmospheric air and the IGU interior which blocked entry of atmospheric water vapor. Particulate desiccant deposited inside the tubular frame elements communicated with air trapped in the IGU interior to remove the entrapped airborne water vapor and thus preclude its condensation within the unit. Thus after the water vapor entrapped in the IGU was removed internal condensation only occurred when the unit failed.

In some cases the sheet metal was roll formed into a continuous tube, with desiccant inserted, and fed to cutting stations where "V" shaped notches were cut in the tube at corner locations. The tube was then cut to length and bent into an appropriate frame shape. The continuous spacer frame, with an appropriate sealant in place, was then assembled in an IGU.

Alternatively, individual roll formed spacer frame tubes were cut to length and "corner keys" were inserted between adjacent frame element ends to form the corners. In some constructions the corner keys were foldable so that the sealant could be extruded onto the frame sides as the frame moved linearly past a sealant extrusion station. The frame was then folded to a rectangular configuration with the sealant in place on the opposite sides. The spacer assembly thus formed was placed between glass lights and the IGU assembly completed.

IGUs have failed because atmospheric water vapor infiltrated the sealant barrier. Infiltration tended to occur at the frame corners because the opposite frame sides were at least partly discontinuous there. For example, frames where the corners were formed by cutting "V" shaped notches at corner locations in a single long tube. The notches enabled bending the tube to form mitred corner joints; but afterwards potential infiltration paths extended along the corner parting lines substantially across the opposite frame faces at each corner.

Likewise in IGUs employing corner keys, potential infiltration paths were formed by the junctures of the keys and frame elements. Furthermore, when such frames were folded into their final forms with sealant applied, the amount of sealant at the frame corners tended to be less than the amount deposited along the frame sides. Reduced sealant at the frame corners tended to cause vapor leakage paths.

In all these proposals the frame elements had to be cut to length in one way or another and, in the case of frames connected together by corner keys, the keys were installed before applying the sealant. These were all manual operations which limited production rates. Accordingly, fabricating IGUs from these frames entailed generating appreciable amounts of scrap and performing inefficient manual operations.

In spacer frame constructions where the roll forming occurred immediately before the spacer assembly was completed, sawing, desiccant filling and frame element end plugging operations had to be performed by hand which greatly slowed production of units.

The present invention provides a new and improved method and apparatus for making IGUs wherein a thin flat strip of sheet material is continuously formed into a channel shaped spacer frame having corner structures and end structures, the spacer thus formed is cut off, sealant and desiccant are applied and the assemblage is bent to form a spacer assembly.

DISCLOSURE OF THE INVENTION

In a preferred method of making a spacer assembly according to the invention a supply of thin relatively narrow sheet metal stock is fed endwise to a first forming station where spacer frame corner structures are formed. The stock is fed to a second forming station where a rigid linearly extending frame element, channel shaped in cross sectional configuration, is formed with the corner structures disposed at least partly in opposite channel side walls. The frame element is severed to define leading and trailing spacer frame ends and a sealant material is applied to external surface areas. The spacer is then bent at the corner structures and the frame ends are secured to complete the spacer assembly.

The preferred method comprises altering the size of one frame element end so that the frame ends telescope together.

In the preferred method the end and corner structures are formed by stamping the stock to form weakened zones at spaced locations along the extent of the stock.

Bending the spacer frame corners comprises deforming opposite frame element side walls by bending each corner structure toward the opposite side wall while feeding the spacer frame to the sealant applying station.

Further features and advantages will become apparent from the following detailed description of a preferred embodiment made with reference to the accompanying drawings.

DETAILED DESCRIPTION

Figure 1:
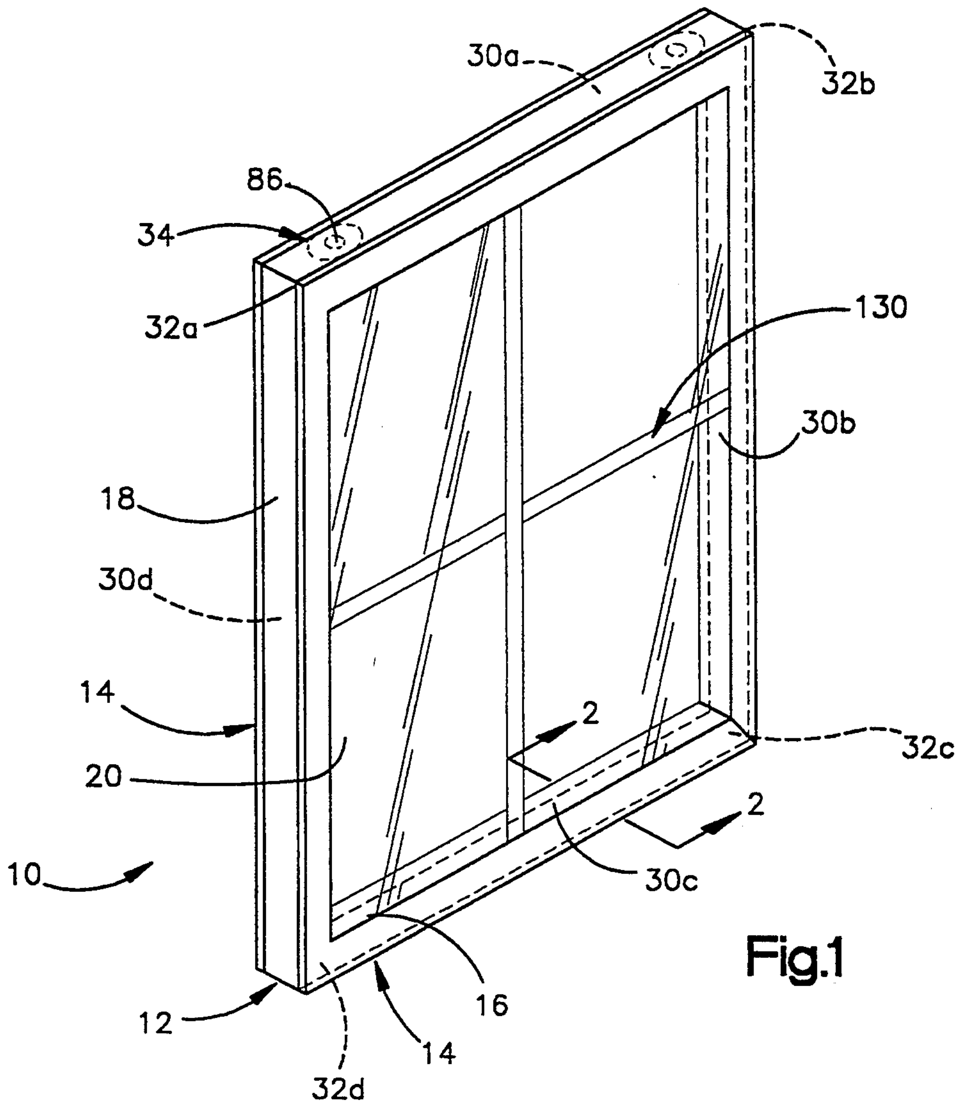
FIG. 1 is perspective view of an insulating glass unit comprising a spacer assembly constructed according to the invention.
Figure 2:
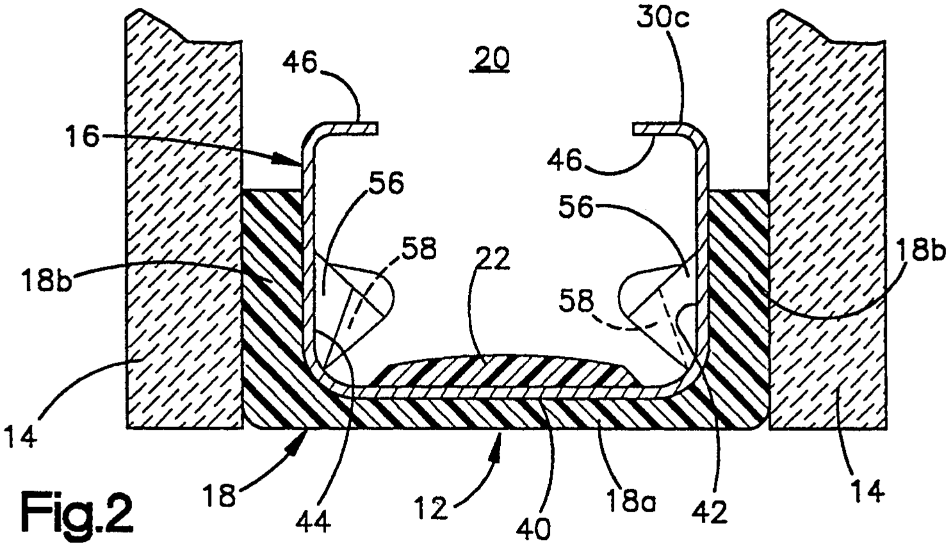
FIG. 2 is a cross sectional view seen approximately from the plane indicated by the line 2—2 of FIG. 1.

The drawing Figures and following specification disclose a method and apparatus for producing spacer assemblies forming parts of insulating glass units. The new method and apparatus are embodied in a production line which forms sheet metal ribbon-like stock material into spacers carrying sealant and desiccant for completing the construction of insulating glass units.

THE INSULATING GLASS UNIT

An insulating glass unit 10 constructed using the method and apparatus of the present invention is illustrated by FIGS. 1-6 as comprising a spacer assembly 12 sandwiched between glass sheets, or lights, 14. The assembly 12 comprises a frame structure 16, sealant material 18 for hermetically joining the frame to the lights to form a closed space 20 within the unit 10 and a body 22 of desiccant in the space 20. See FIG. 2. The unit 10 is illustrated in FIG. 1 as in condition for final assembly into a window or door frame, not illustrated, for ultimate installation in a building.

The assembly 12 maintains the lights 14 spaced apart from each other to produce the hermetic insulating "dead air space" 20 between them. The frame 16 and the sealant body 18 coact to provide a structure which maintains the lights 14 properly assembled with the space 20 sealed from atmospheric moisture over long time periods during which the unit 10 is subjected to frequent significant thermal stresses. The desiccant body 22 removes water vapor from air, or other gas, entrapped in the space 20 during construction of the unit 10.

The sealant body 18 both structurally adheres the lights 14 to the spacer assembly 12 and hermetically closes the space 20 against infiltration of airborne water vapor from the atmosphere surrounding the unit 10. The illustrated body 18 is formed from a "hot melt" material which is attached to the frame sides and outer periphery to form a U-shaped cross section.

The structural elements of the frame 16 are produced by the method and apparatus of the present invention and therefore are of particular interest here. The frame 16 extends about the unit periphery to provide a structurally strong, stable spacer for maintaining the lights aligned and spaced while minimizing heat conduction between the lights via the frame. The preferred frame 16 comprises a plurality of spacer frame segments, or members, **30*a–d* connected to form a planar, polygonal frame shape, element juncture forming frame corner structures 32*a–d*, and connecting structure 34** for joining opposite frame element ends to complete the closed frame shape.

Each frame member 30 is elongated and has a channel shaped cross section defining a peripheral wall 40 and first and second lateral walls 42, 44. See FIG. 2. The peripheral wall 40 extends continuously about the unit 10 except where the connecting structure 34 joins the frame member ends. The lateral walls 42, 44 are integral with respective opposite peripheral wall edges. The lateral walls extend inwardly from the peripheral wall 40 in a direction parallel to the planes of the lights and the frame. The preferred frame 16 has stiffening flanges 46 formed along the inwardly projecting lateral wall edges. The lateral walls 42, 44 rigidify the frame member 30 so it resists flexure and bending in a direction transverse to its longitudinal extent. The flanges 46 stiffen the walls 42, 44 so they resist bending and flexure transverse to their longitudinal extents.

Figure 3:
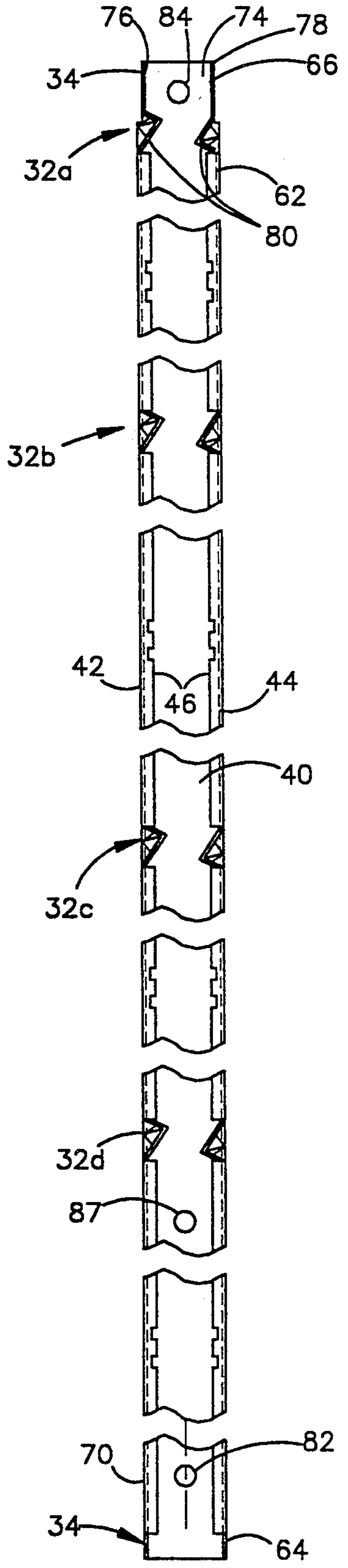
FIG. 3 is a fragmentary plan view of a spacer frame element before the element has had sealant applied and in an unfolded condition.
Figure 4:
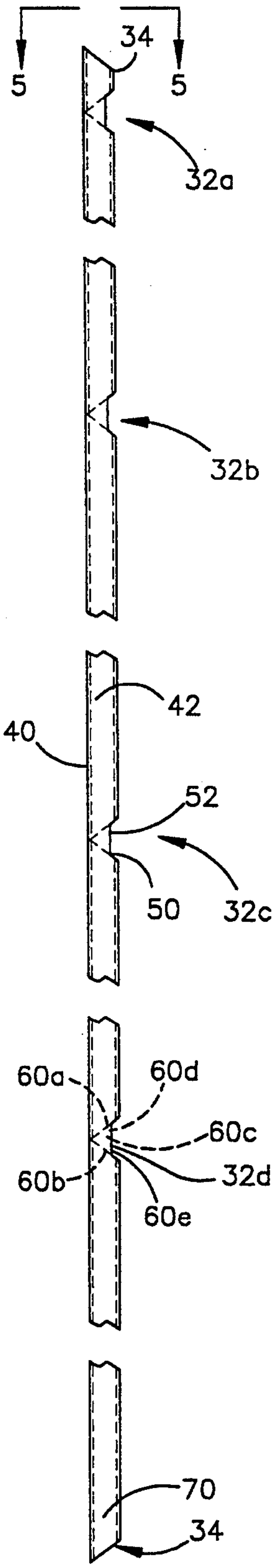
FIG. 4 is a fragmentary elevational view of the element of FIG. 3.
Figure 5:
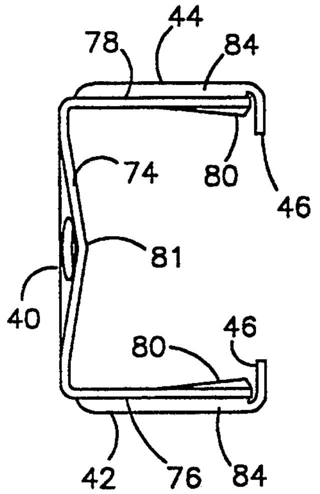
FIG. 5 is an enlarged elevational view seen approximately from the plane indicated by the line 5—5 of FIG. 4.
Figure 6:
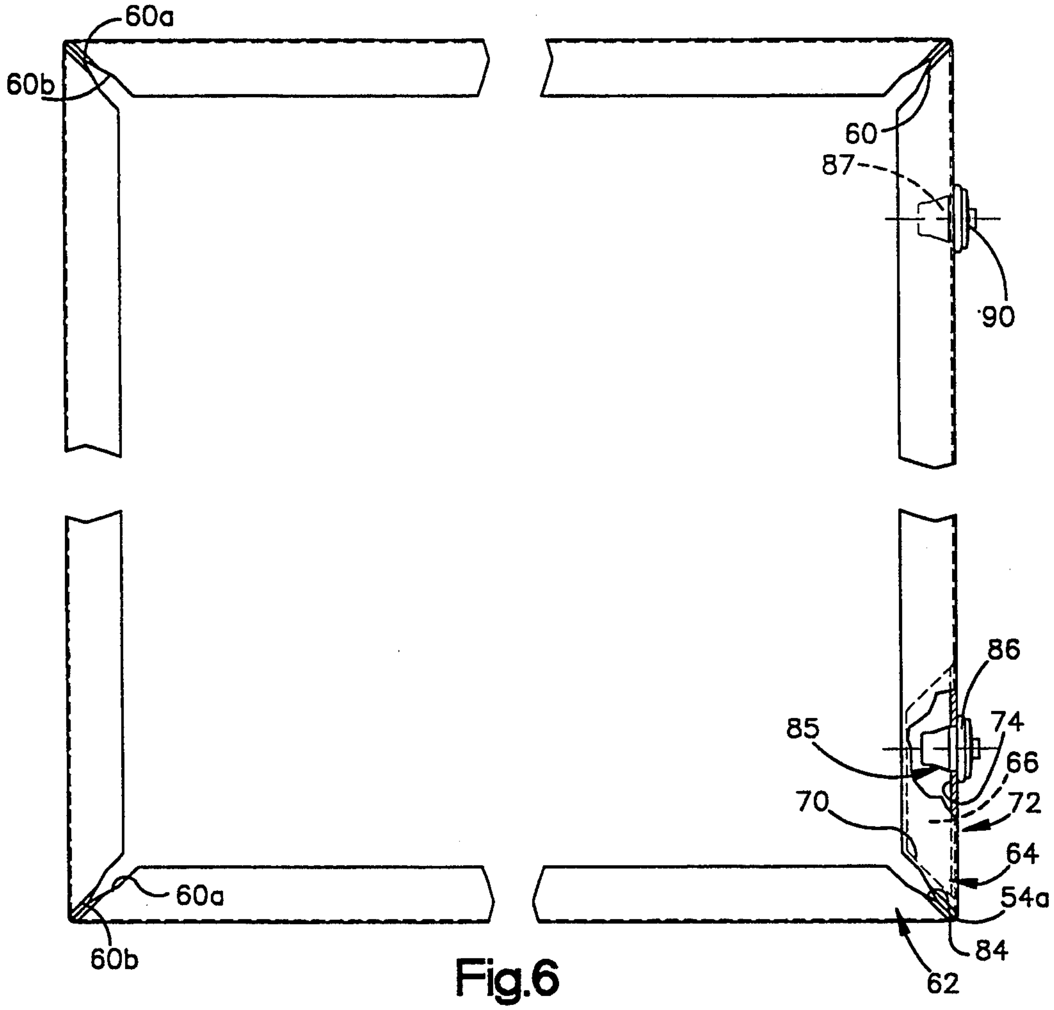
FIG. 6 is a fragmentary elevational view of a spacer frame forming part of the unit of FIG. 1 which is illustrated in a partially constructed condition.

The frame is initially formed as a continuous straight channel constructed from a thin ribbon of stainless steel material (e.g., 304 stainless steel having a thickness of 0.006–0.010 inches). Other materials, such as galvanized or tin plated steel, may also be used to construct the channel. The corner structures 32 are made to facilitate bending the frame channel to the final, polygonal frame configuration in the unit 10 while assuring an effective vapor seal at the frame corners as seen in FIGS. 3–5. The sealant body 18 is applied and adhered to the channel before the corners are bent. The corner structures 32 initially comprise notches 50 and weakened zones 52 formed in the walls 42, 44 at frame corner locations. See FIGS. 3–6. The notches 50 extend into the walls 42, 44 from the respective lateral wall edges. The lateral walls 42, 44 extend continuously along the frame 16 from one end to the other. The walls 42, 44 are weakened at the corner locations because the notches reduce the amount of lateral wall material and eliminate the stiffening flanges 46 and because the walls are stamped to weaken them at the corners.

The connecting structure 34 secures the opposite frame ends 62, 64 together when the frame has been bent to its final configuration. The illustrated connecting structure comprises a connecting tongue structure 66 continuous with and projecting from the frame structure end 62 and a tongue receiving structure 70 at the other frame end 64. The preferred tongue and tongue receiving structures 66, 70 are constructed and sized relative to each other to form a telescopic joint 72. See FIG. 6. When assembled, the telescopic joint 72 maintains the frame in its final polygonal configuration prior to assembly of the unit 10.

In the illustrated embodiment the connector structure 34 further comprises a fastener arrangement 85 for both connecting the opposite frame ends together and providing a temporary vent for the space 20 while the unit 10 is being fabricated. The illustrated fastener arrangement (see FIGS. 3 and 6) is formed by connector holes 84, 82 located, respectively, in the tongue 66 and the frame end 64, and a rivet 86 extending through the connector holes 82, 84 for clinching the tongue 66 and frame end 64 together. The connector holes are aligned when the frame ends are properly telescoped together and provide a gas passage before the rivet is installed.

In some circumstances it may be desirable to provide two gas passages in the unit 10 so the inert gas flooding the space 20 can flow into the space 20 through one passage displacing residual air from the space through the second passage. The drawings show such a unit. See FIGS. 3 and 6. The second passage 87 is formed by a punched hole in the frame wall 40 spaced along the common frame member from the connector hole 84. The sealant body 18 and the desiccant body 22 each defines an opening surrounding the hole 84 so that air venting from the space 20 is not impeded. The second passage 87 is closed by a blind rivet 90 identical to the rivet 86. The rivets 86, 90 are installed at the same time and each is covered with sealant material so that the seal provided by each rivet is augmented by the sealant material.

Further details concerning the construction of the unit 10 can be found in copending application Ser. No. 07/827,281 filed Jan. 29, 1992, the disclosure of which is incorporated herein in its entirety by this reference to it.

THE SPACER ASSEMBLY PRODUCTION LINE

Figure 7:
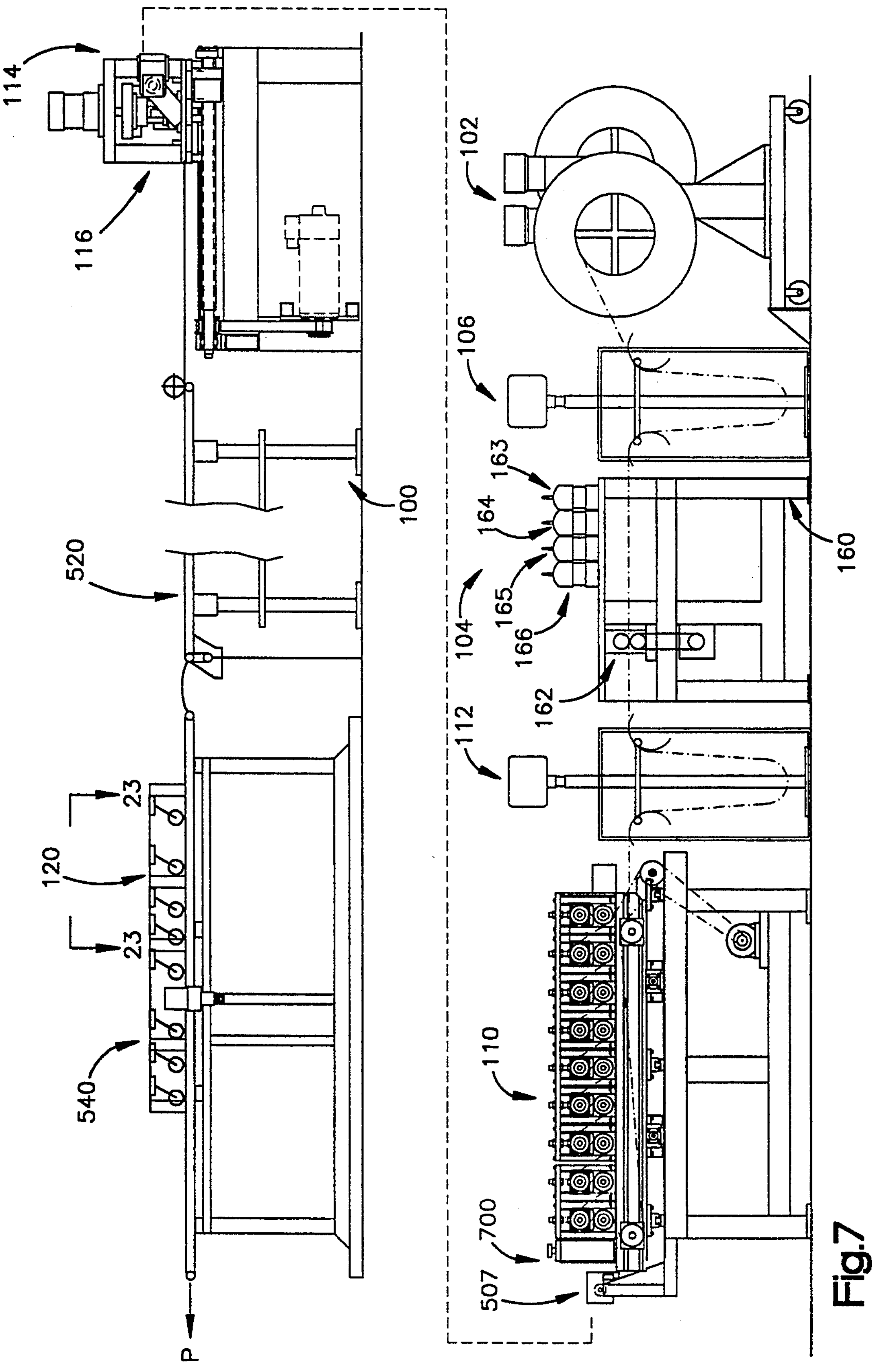
FIG. 7 is an elevational view of a spacer assembly production line constructed according to the invention.

As indicated previously the spacer assembly construction, and primarily that of the frame 16, is of particular interest because it may be fabricated by using the method and apparatus of the present invention. In particular, the frame and spacer assembly are formed essentially continuously at high rates of production and without requiring any manual operations or operator intervention until the assembly is ready for folding and attachment to the glass lights. The operation by which the frame 16 and the assembly 12 are fashioned is schematically illustrated by FIG. 7 as a production line 100 through which a thin, relatively narrow ribbon of sheet metal stock is fed endwise from a coil into one end of the assembly line and substantially completed spacer assemblies emerge from the other end of the line 100.

The line 100 comprises a stock supply station 102 from which stock is fed to a first forming station 104 through a loop feed sensor 106, a second forming station 110 to which stock from the station 104 is fed via a second loop feed sensor 112, third and fourth forming stations 114, 116, respectively, where partially formed spacer members are separated from the leading end of the stock and frame corner locations are deformed preparatory to being folded into their final configurations, and an extrusion station 120 where sealant is applied to the yet to be folded frame member. A scheduler/motion controller unit 122 (FIG. 8) interacts with the stations and loop feed sensors to govern the spacer assembly size, the stock feeding speeds in the line, and other parameters involved in production.

THE SUPPLY STATION 102

Figure 10:
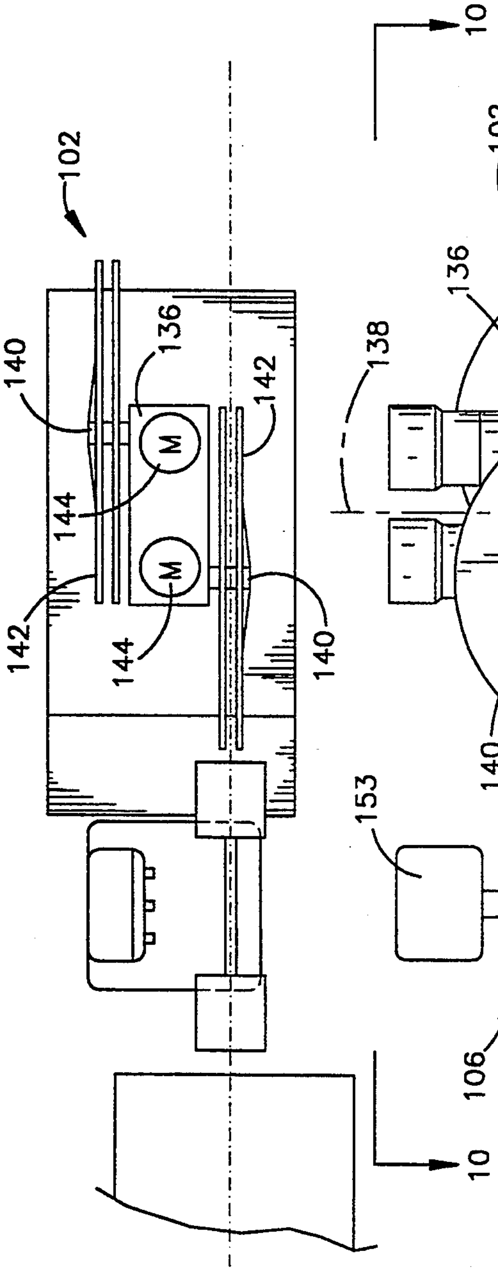
FIG. 10 is a plan view seen approximately from the plane indicated by the line 10—10 in FIG. 9.
Figure 9:
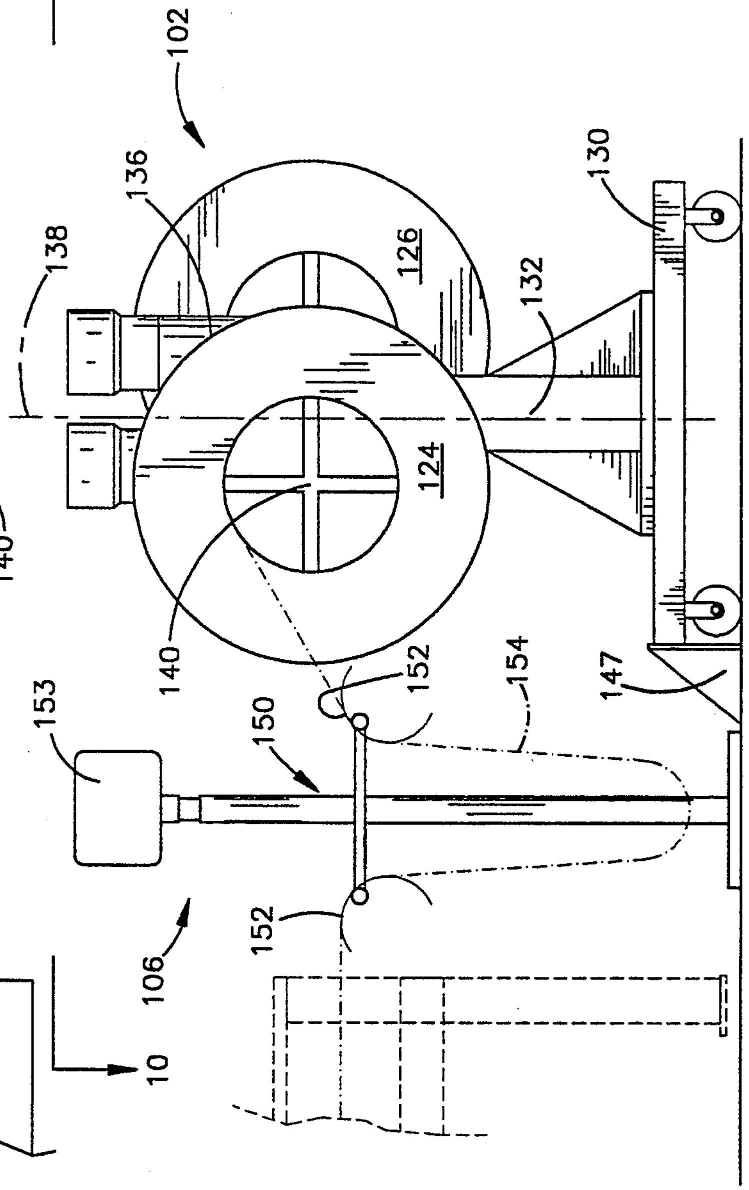
FIG. 9 is an elevational view of a portion of the production line of FIG. 7 shown on an enlarged scale.

The stock supply station 102, best illustrated by FIGS. 9 and 10, houses coils 124, 126 of sheet stock material, one of which is fed uncoiled and from the station 102 while the other is held in reserve. The station 102 comprises a caster mounted support dolly 130 having a vertical support column 132 anchored to it and extending upwardly to a coil support unit.

The coil support unit comprises a support housing 136 mounted on the column 132 by a bearing (not shown) which enables the housing to be rotated relative to the column and dolly about a vertical axis 138 extending through the column. Identical oppositely extending coil supporting stub axle assemblies 140 project from the housing 136 to support the respective coils 124, 126. Each axle assembly 140 is provided with a coil clamping reel structure 142 at its projecting end on which the coil is received. Drive motors 144 each drive a respective axle assembly 140 to feed stock from the station 102. A drive transmission (not shown) within the housing 136 couples each motor to its driven axle. The reel structures 142 are adjustable to receive coils having widths which vary depending upon the size of the frame assemblies being produced by the production line.

The width and depth of the frames 16 being produced may be changed from time to time as desired by passing wider or narrower sheet stock through the production line. When this becomes necessary, the housing 136 is rotated about the bearing axis 138 to place the coil 124 in reserve and position the second coil 126 for feeding the assembly line. A suitable latching mechanism, not illustrated, is provided to lock the housing 136 in place when a coil has been positioned for supplying stock to the assembly line. When stock from the other coil is required for production, the latching mechanism is operated to free the housing 136 for rotation about the axis 138 to bring the second coil into position for feeding the assembly line. The latching mechanism is then operated to lock the housing in place. During the time the stock is payed off the coil 126 for producing flames, the first coil 124 may be replaced, if desired, to provide still another width of stock material which can be held in reserve until needed.

Figure 8:
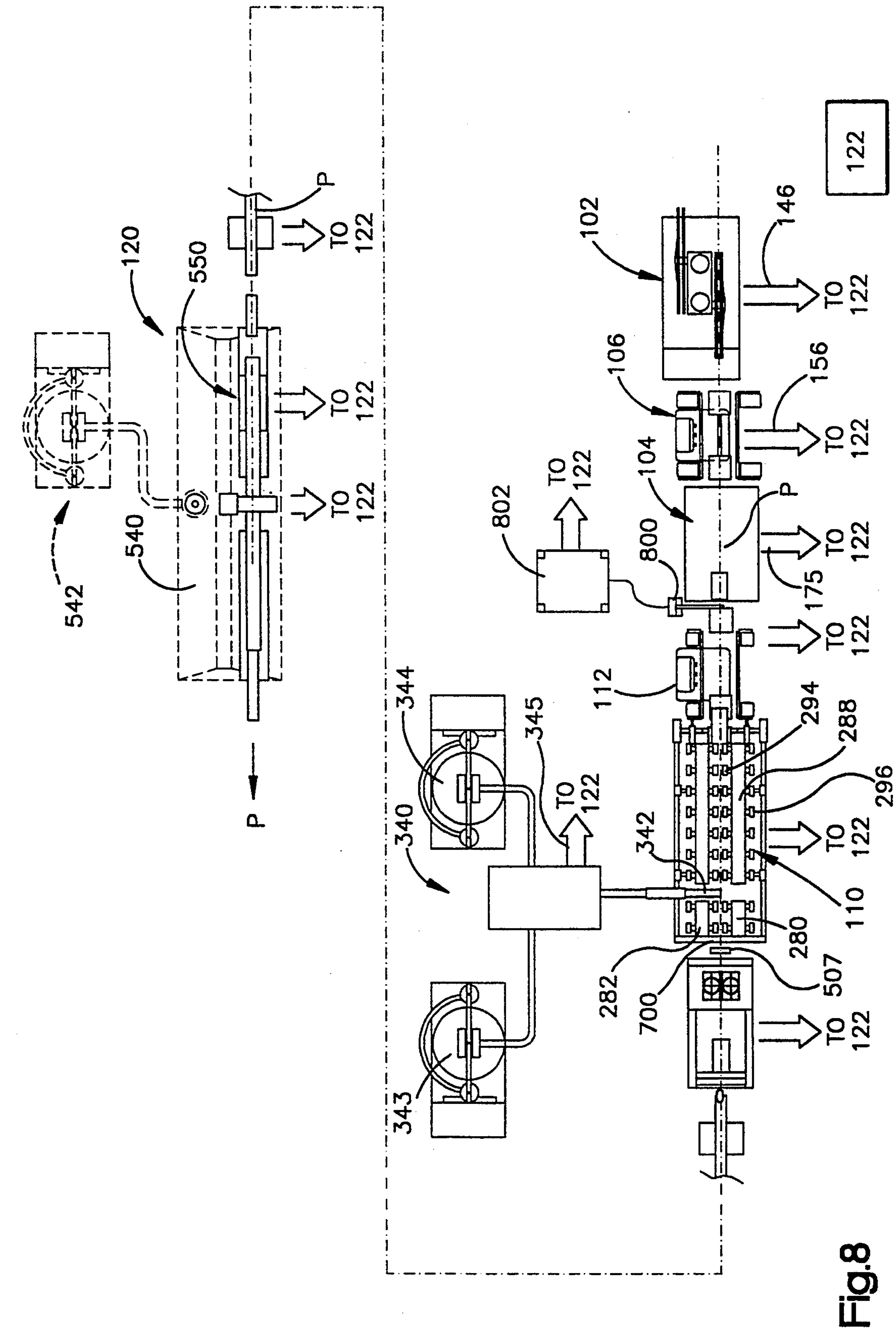
FIG. 8 is a plan view of the production line of FIG. 7.

The motors 144 are electrically powered D.C. motors (power lines are not illustrated) which positively drive and brake the axle assemblies under control of the scheduler/motion controller unit 122 which supplies motor operating signals via a link or line 146 schematically illustrated in FIG. 8. The dolly 130 engages a floor mounted stop bracket 147 when positioned for feeding stock so that the feed coil is positively positioned during frame production.

THE LOOP FEED SENSOR 106

The loop feed sensor 106 (FIGS. 9 and 10) coacts with the controller unit 122 to control the active D.C. motor 144 for preventing paying out excessive stock while assuring a sufficiently high feeding rate through the production line. The sensor 106 comprises a stand 150 positioned immediately adjacent the supply station 102, aligned arcuate stock guides 152 spaced apart along the stock path of travel and a loop signal processing unit 153. Stock fed to the sensor 106 from the supply station 102 passes over the first guide 152, droops in a catenary loop 154 and passes over the second guide 152 before exiting the sensor 106. The depth of the loop 154 is maintained between predetermined levels by the unit 153. The unit 153 includes an ultrasonic loop detector (not illustrated) which directs a beam of ultrasound against the lowermost segment of the stock loop. The loop detector detects the loop location from reflected ultrasonic waves and signals the controller unit 122. A signal is output from the sensor unit 106 via the line 156 (FIG. 8) to the controller unit 122. The unit 122 speeds up, slows or stops the D.C. motor 144 to control the feed rate of stock to the production line.

THE FORMING STATION 104

Figure 11:
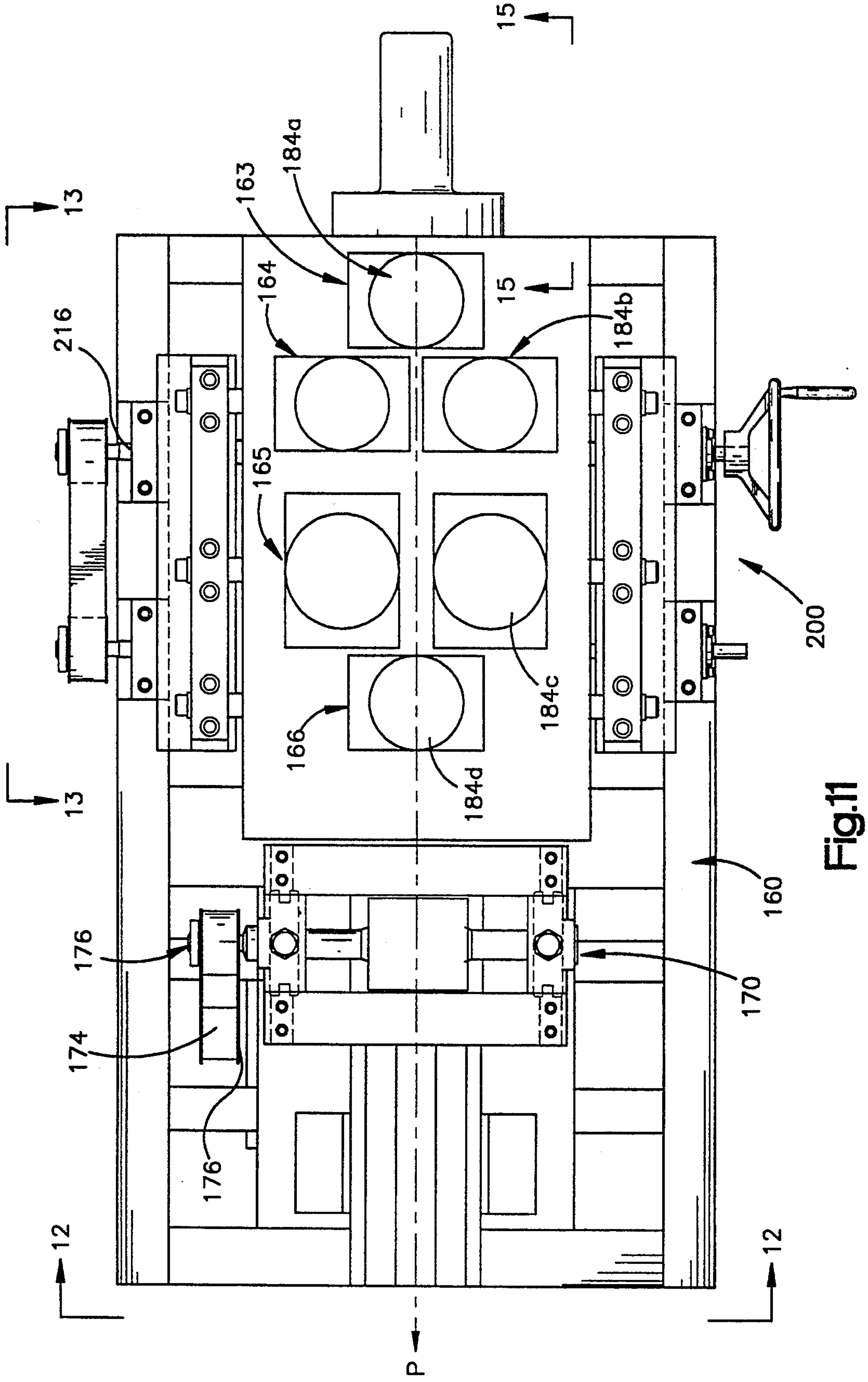
FIG. 11 is a plan view of a portion of the production line of FIG. 7.
Figure 13:
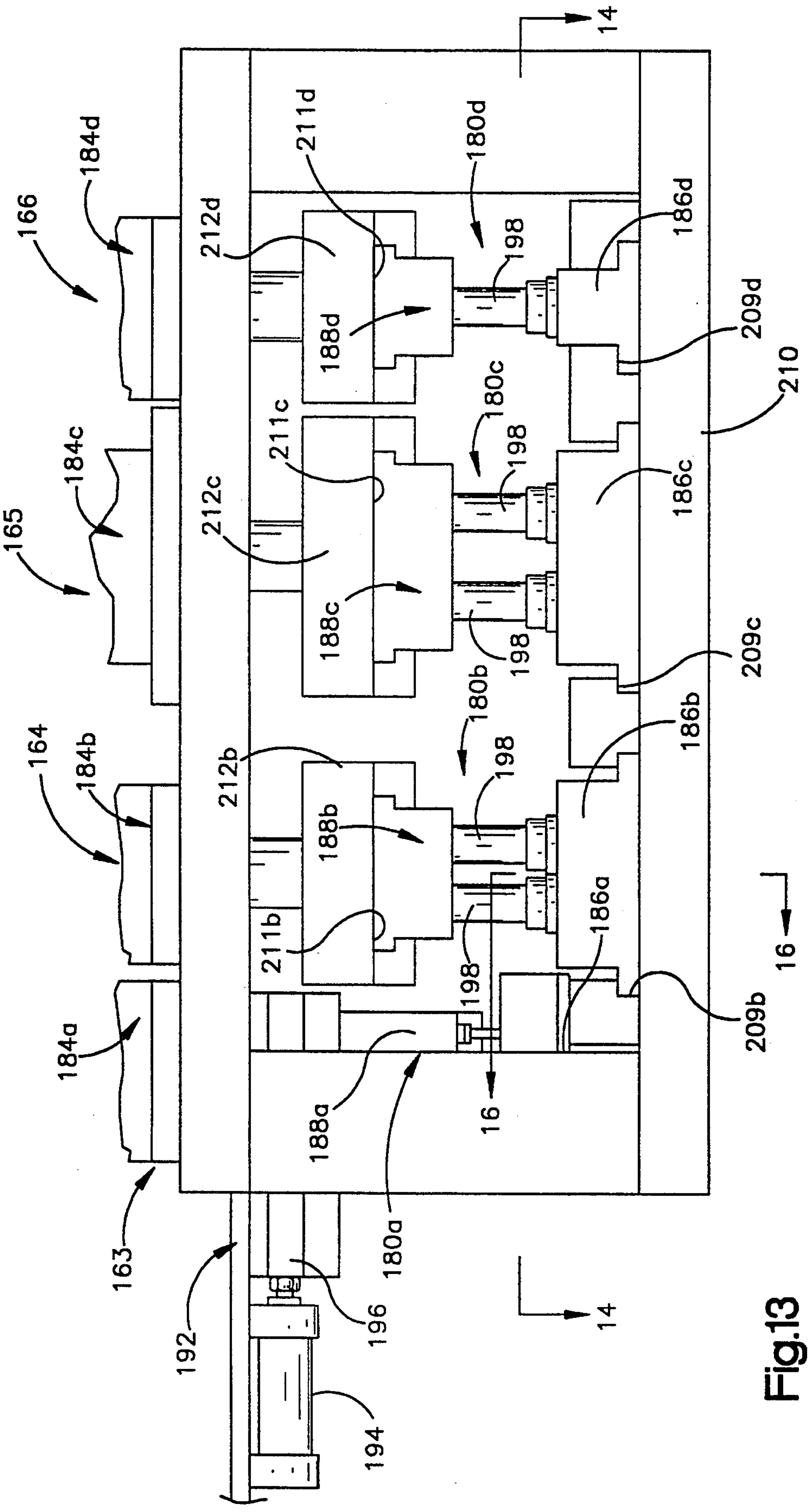
FIG. 13 is an elevational view seen approximately from the plane indicated by line 13—13 in FIG. 11.

The forming station 104 (FIGS. 7, 11 and 13) withdraws the stock from the loop sensor 106 and, in the preferred embodiment, performs a series of precise stamping operations on the stock passing through it. The station 104 comprises a supporting framework 160 fixed to the factory floor adjacent the loop sensor, a stock driving system 162 which moves the stock through the station, and stamping units 163–166 where individual stamping operations are carried out on the stock.

Figure 12:
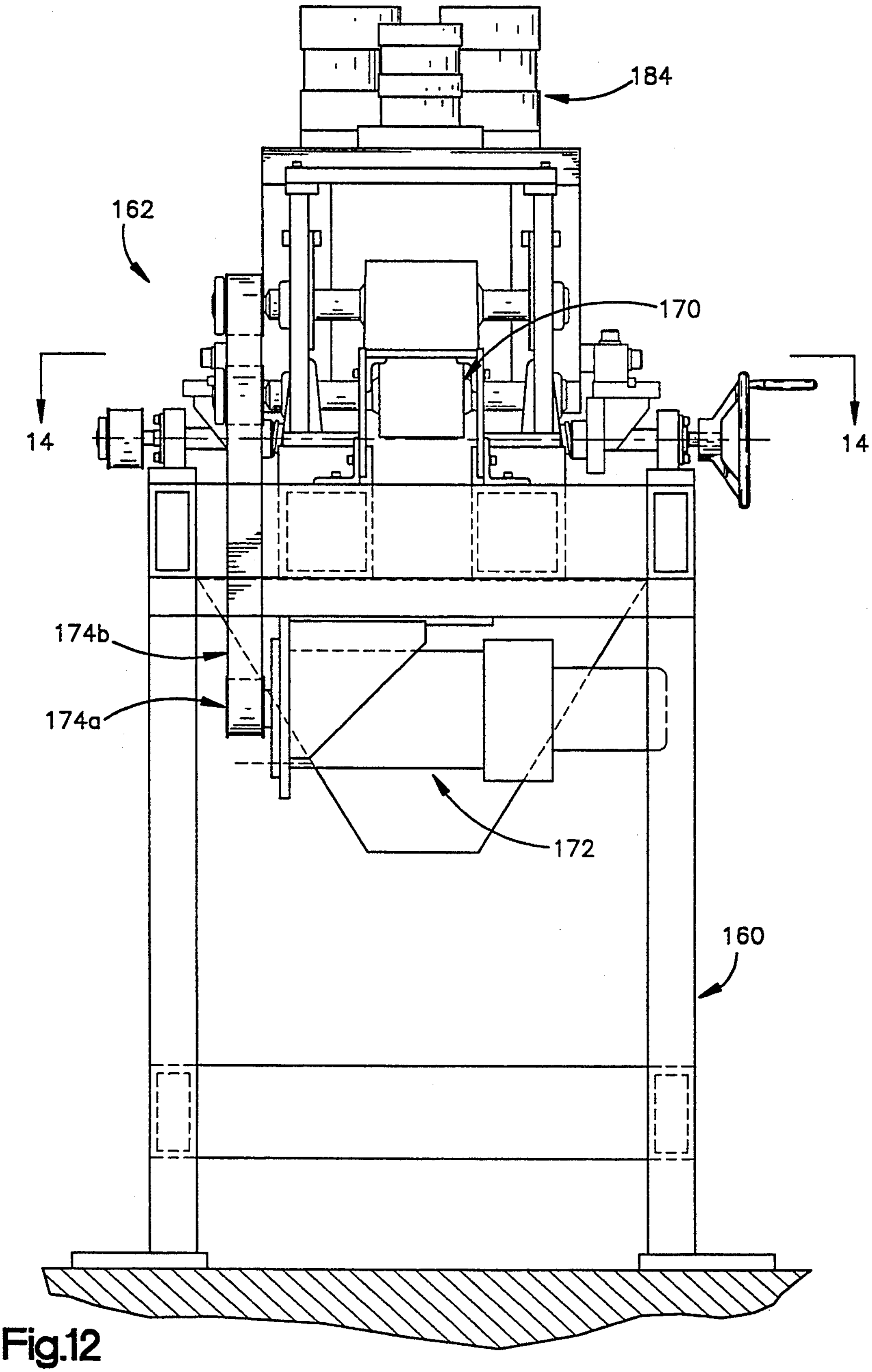
FIG. 12 is an elevational view seen approximately from the plane indicated by line 12—12 in FIG. 11.

The stock driving system 162 comprises a stock driving roll set 170 secured to the framework 160 along the stock path of travel P at the exit end of the station 102, a motor 172 (FIG. 12) operated by the controller unit 122 for precisely driving the roll set 170, and a positive drive transmission 174 including a pulley **174*a* and a belt 174*b* coupling the motor 172 and the roll set 170**.

The preferred roll set comprises a pair of drive rolls rigidly supported by bearings secured to the framework 160. The rolls define a nip for securely gripping the stock and pulling it through the station 102 past the stamping units 163–166. The rolls grip the stock so tightly that there is no stock slippage relative to either roll as the stock advances.

The motor 172 is preferably an electric servomotor of the type constructed and arranged to start and stop with great precision. Accordingly, stock passes through the station 102 at precisely controlled speeds and stops precisely at predetermined locations, all depending on signals from the controller unit 122 to the motor 172 on the line 175 (FIG. 8). While a servo motor is disclosed in the preferred production line, it may be possible to use other kinds of motors or different stock feeding mechanisms.

The drive transmission 174 is illustrated as a timing belt reeved around sheaves 176 respectively secured to the motor shaft and each shaft of the roll set 170. The timing belt is quite flexible, does not stretch in use, and has tooth-like lugs which positively engage each sheave so that the motor and roll shafts are all driven together without any slippage. Consequently, the motor shaft movement is faithfully transmitted to the roll set 170 by the timing belt so stock motion is precisely controlled as desired in the station 102. As an alternative, the roll set 170 may be driven by gears connected to the motor shaft.

Figure 14:
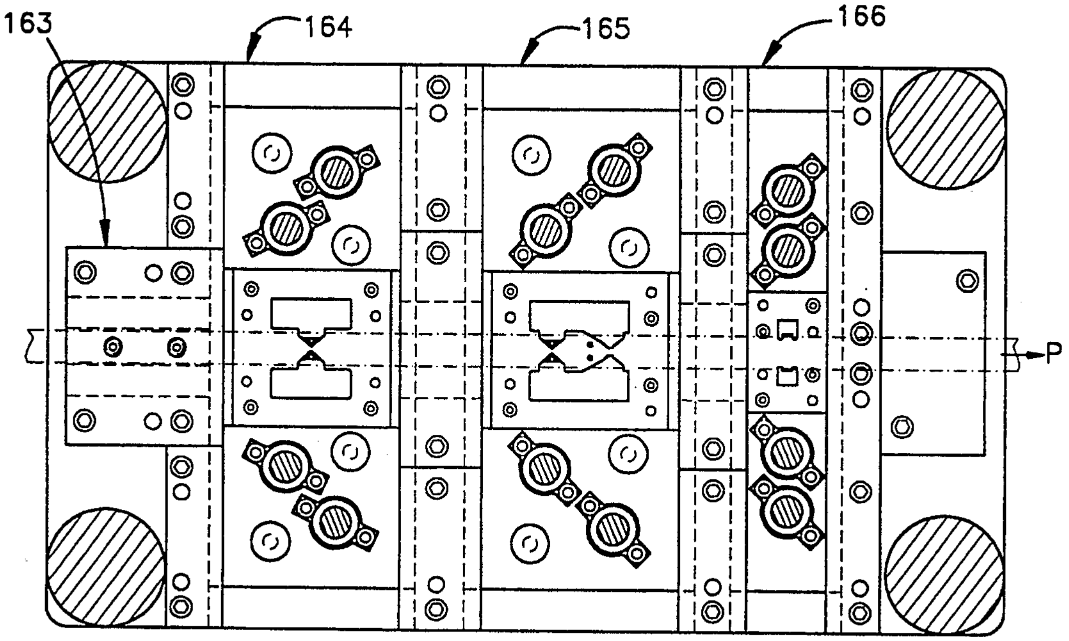
FIG. 14 is a cross-sectional view seen approximately from the plane indicated by line 14—14 of FIG. 13.

Each stamping unit 163–166 comprises a die assembly 180 and a die actuator assembly, or ram assembly, 184. Each die assembly comprises a die set having a lower die, or anvil, 186 beneath the stock travel path and an upper die, or hammer, 188 above the travel path. See FIGS. 13 and 14. The stock passes between the dies as it moves through the station 102. Each hammer 188 is coupled to its respective ram assembly 184. Each ram assembly forces its associated dies together with the stock between them to perform a particular stamping operation on the stock. For convenience, the die assemblies and ram assemblies of successive stamping units are identified by common reference numerals having different respective suffix letters.

Each ram assembly 184 is securely mounted atop the framework 160 and connected to a source (not shown) of high pressure operating air via suitable conduits (not shown). Each ram assembly 184 is operated from the controller 122 which outputs a control signal to a suitable or conventional ram controlling valve arrangement (not shown) when the stock has been positioned appropriately for stamping.

Figure 15:
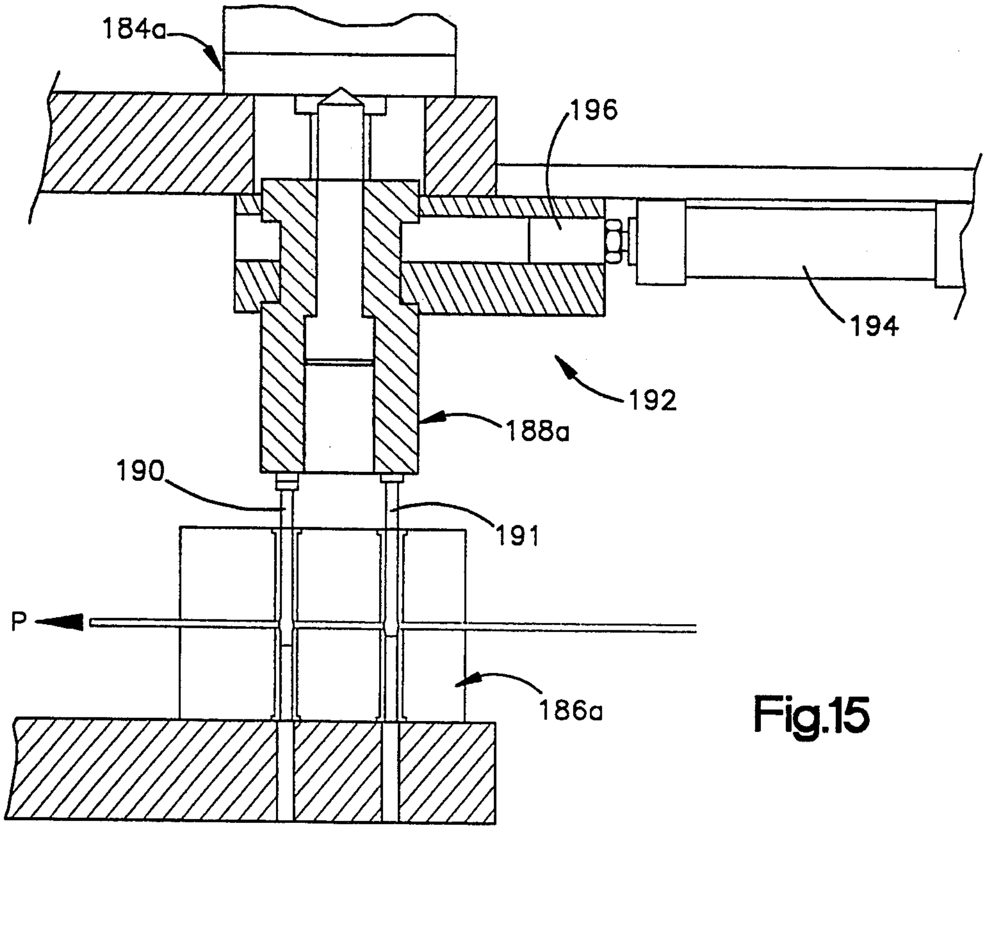
FIG. 15 is a fragmentary view with parts broken away seen approximately from the plane indicated by line 15—15 in FIG. 11.

The stamping unit 163 punches the connector holes 82, 84 in the stock at the leading and trailing end locations of each frame member. The passage 87 is also punched in the stock by the unit 163. In the illustrated embodiment (see FIG. 15) the die set anvil **186*a* defines a pair of cylindrical openings disposed on the stock centerline a precise distance apart along the stock path of travel P. The hammer 188*a* is formed in part by corresponding cylindrical punches 190, 191 each aligned with a respective anvil opening and dimensioned to just fit within the aligned opening. The ram 184*a* is actuated to drive the punches downwardly through the stock and into their respective receiving openings. The punch 190 is slightly longer than the punch 191 so theft the punch 190 pierces and passes completely through the stock before the punch 191** makes initial contact.

The stock is fed into the stamping station 163 by the driving system 162 and stopped with predetermined stock locations precisely aligned in the stamping station 163. The punches 190, 191 are actuated by the ram **186*a* so that the connector holes 82, 84 are punched on the stock midline, or longitudinal axis. When the punches 190, 191** are withdrawn, the stock feed resumes.

The stamping unit 163 is constructed for punching a single hole so that the passage 87 is formed. When the location for punching the passage 87 is aligned with the punch 190, the stock feed is stopped again. A punch travel limiting mechanism 192 is operated to limit movement of the punch 191 by the actuator 184*a*. The travel limiting mechanism stops the punch movement just after the punch 190 has pierced the stock to form the passage 87 but before the punch 191 makes contact with the stock.

The preferred mechanism 192 comprises a pneumatic ram and cylinder 194 and a bolt-like member 196 fixed to the projecting ram end. The ram and cylinder 194 extends the bolt member 196 into the stroke path of the actuator 184*a* to positively limit the punch travel. The fact that the actuator 184*a* is pneumatically operated enables limiting its stroke without risk of damaging parts of the unit 163. After the passage 86 is punched the ram 194 retracts the bolt member 196.

The stamping unit 164 forms the frame corner structures 32*b–d* but not the corner structure 32*a* adjacent the frame tongue 66. The unit 164 comprises a die assembly 180*b* operated by a ram assembly 184*b*. The die assembly 180*b* punches material from respective stock edges to form the corner notches 50. The die assembly 180*b* also stamps the stock at the corner locations to define the weakened zones 52 which facilitate folding the spacer frame member at the corner locations. The ram assembly 184*b* preferably comprises a pair of rams connected to the upper die 188*b*.

Each weakened zone 52 is illustrated as formed by a series of score lines radiating from a corner bend line location on the stock toward the adjacent stock edge formed by the corner notch 50. The score lines are formed by sharp edged ridges on the anvil 186*b*. These ridges have different heights to provide differentially weak score lines. The frame members produced by the production line 100 have common side wall depths even though the frame width varies. Therefore, the score lines on the anvil 186*b* are effective to form the corner structures for all the frame members made by the line 100.

When the frame member is eventually bent to form the corner, the score lines yield to produce a pleat-like structure at the folded corner. The pleat-like structures bend inwardly toward each other but do not clash. The deepest score line produced by the die set on one side of the stock is not opposed from the deepest score line produced by the die on the other side of the stock. The pleats tend to bend most easily and to the greatest extent at the deepest score line because that is the weakest area of the corner. The pleats therefore bend unsymmetrically as the frame corner is folded.

The stamping unit 165 configures the leading and trailing ends of each spacer frame member. The unit 165 comprises a die assembly 180*c* operated by a ram assembly 184*c*. The die assembly is configured to punch out the profile of the frame member leading end 62 as well as the profile of the adjoining frame member trailing end 64 with a single stroke. The leading frame end 62 is formed by the tongue 66 and the associated corner structure 32*a*. A trailing frame end 64 associated with the preceding frame member is immediately adjacent the tongue 66 and remains connected to the tongue 66 when the stock passes from the unit 165. The ram assembly 184*c* comprises a pair of rams each connected to the hammer 188*c*.

The corner structure 32*a* is generally similar to the corner structures 32*b–d* except the notches 50 associated with the corner 32*a* differ due to their juncture with the tongue 66. The die assembly therefore comprises score line forming ridges like the die set forming the remaining frame corners 32*b–d*.

In the illustrated embodiment the stamping unit 166 forms muntin bar clip mounting notches in the stock. Muntin bar mounting clips and mounting structures are illustrated in the cross referenced application. The muntin bar mounting structures include small rectangular notches. The unit 166 comprises a ram assembly 184*d* coupled to the notching die assembly 180*d*. The anvil 186*d* and hammer 188*d* of the notching die assembly are configured to punch a pair of small square corner notches on each edge of the stock. Accordingly the ram assembly 184*d* comprises a single ram which is sufficient to power this stamping operation. A single stroke of the ram actuates the die set to form the opposed notches simultaneously and in alignment with each other along the opposite stock edges.

In order to accommodate wider or narrower stock passing through the station 102 each of the die assemblies 180*b–d* is split along the center line of the stock travel path P. The opposite "sides" of the split die assemblies are adjustably movable toward and away from the centerline of the path P to form different width spacer frames. Thus, each anvil 186*b–d* is split along the path of travel P into two parts and each hammer 188*b–d* is likewise split along the path of travel P center line.

The opposed hammer and anvil parts are linked by vertically extending guide rods 198. The guide rods 198 are fixed in the hammer parts and slidably extend through bushings in the opposed anvil parts. The guide rods 198 both guide the hammers into engagement with their respective anvils and link the hammers and respective anvils so that all the hammers and anvils are adjusted laterally together.

The opposed hammer and anvil parts of each die assembly are movable laterally towards and away from the path of travel P centerline by an actuating system 200 to desired adjusted positions for working on stock of different widths. The system 200 firmly fixes the die assembly parts at their laterally adjusted locations for further frame production. In the preferred and illustrated embodiment the anvil parts of each die assembly 180*b–d* are respectively supported in ways 209 attached to a single lower plate or platen 210 which is fixed to stamping unit frame. The hammer parts of each die assembly are each supported in ways 211 formed in a single, respective upper platen 212*b–d* fixed to its respective die actuator, or ram 184*b–d*. The ways 209, 211 extend transversely of the travel path P and the actuating system 200 shifts the hammer parts and the anvil parts simultaneously along the respective ways between adjusted positions.

Figure 16:
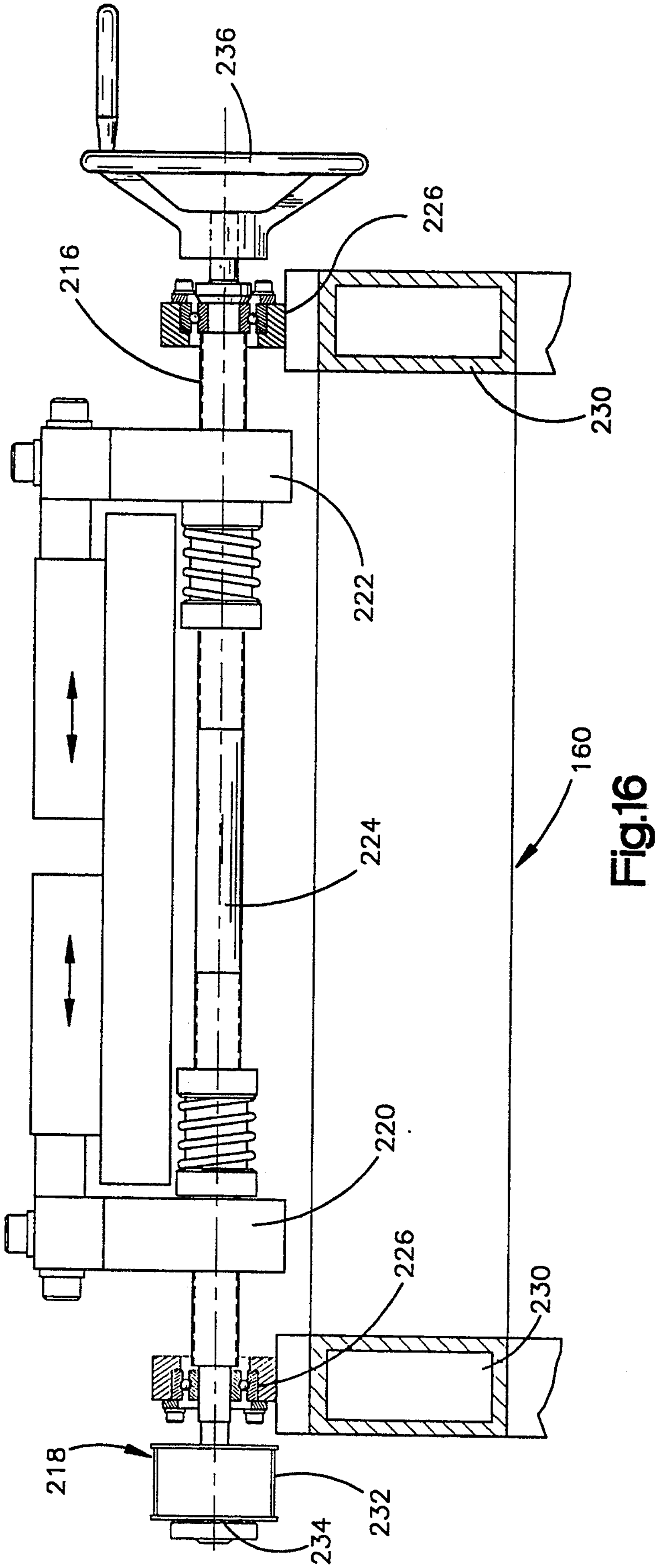
FIG. 16 is an elevational view seen approximately from the plane indicated by line 16—16 in FIG. 13.

The preferred and illustrated actuating system 200 provides positive and extremely accurate die assembly section placement relative to the stock path of travel P. The system 200 comprises a pair of right and left hand threaded jackscrews 216 extending between lateral sides of the framework, a drive transmission 218 between the jackscrews, and die assembly driving members 220, 222 driven by the jack screws and rigidly linking the jack screws to the anvil parts. See FIGS. 12 and 16.

The jackscrews 216 are disposed on parallel axes 224 and mounted in bearing assemblies 226 connected to lateral side frame members 230 forming part of the framework 160. Each jackscrew is threaded into the die assembly driving members 220, 222. The member 220 is threaded onto jackscrew threads having one hand while the member 222 is threaded onto jack screw threads having the opposite hand. Thus when the jackscrews rotate in one direction the driving members 220, 222 force their associated die sections to shift laterally away from each other relative to the stock path of travel. Jackscrew rotation in the other direction shifts the die sections toward each other relative to the path of travel. The threads on the jackscrews are precisely cut so that the extent of lateral die section movement is precisely related to the angular displacement of the jackscrews creating the movement.

The hammer sections of the die assemblies are adjustably moved by the anvil sections. The guide rods 198 extending between confronting anvil and hammer die sections are structurally strong and stiff and serve to shift the hammer sections of the die assemblies laterally with the anvil sections. The hammer sections are relatively easily moved along the upper platen ways 211.

In the illustrated embodiment the transmission 218 comprises a timing belt 232 and conforming pulleys 234 on the jackscrews around which the belt is reeved. The master jackscrew carries a handwheel 236 at its outer end so that when the machine operator turns the handwheel both jackscrews are positively driven in one rotational direction, each about its respective axis 224. The angular position of the jackscrews is measured and displayed by a suitable indicator (not shown) positioned where it can be read by the operator. In the preferred embodiment a digital encoder (not illustrated) is associated with one of the jackscrews. The encoder is coupled, via the scheduler/motion controller unit 122, to a digital display mounted on the framework adjacent the handwheel so the operator can precisely control the lateral position of the stamping dies. As an alternative, precise movement of the jackscrews can be accomplished by using a stepper motor or servomotor linked to and controlled by motion control unit 122.

The stock moves through the forming station 104 intermittently, stopping completely at each location where it is stamped. The average rate of stock feed can vary widely from one frame member to the next. For instance, if the station 104 forms a spacer frame member for ultimate use in a large "picture" window having no muntin bars, the rate of stock feed is relatively high because the stock is stopped only to stamp the corner structures, the frame ends and to punch holes. The stock moves continuously (and may move rapidly) through the station between corner structure locations.

If the immediately succeeding spacer frame is intended for use in a relatively small window having a number of muntin bars the stock feed must be stopped to stamp all the muntin bar connection locations as well as the remaining stamping operations. The average rate of stock feed in this case is quite low because of all the stops.

In certain instances it is desirable to print identifying information on the channel. An ink jet printhead 800 coupled to a print controller 802 applies indicia to the channel. The print controller 802 communicates with the control unit 122 via a communications interface. In response to receipt of a photodetector signal which monitors movement of the channel, the control unit 122 tells the printhead controller 802 to start printing and also the contents of that printing. The position of the printhead 800 may be dependant on the positioning of the indicia. If the indicia is applied to the stiffening lip 46, for example, printing must be done after the channel has been bent to its "C" shape.

THE LOOP FEED SENSOR 112

The loop feed sensor 112 directs (see FIG. 7) the stock from the station 104 to the forming stations 110, 114 and functions to assure that the stock feed rate is controlled. The loop feed sensor 112 coacts with the unit 122 to control the stock feed through the stations 104, 110 and 114. If the feed rate through the station 104 is extremely low, the sensor 112 and controller unit 122 may detect the reduction in stock passing through the sensor 112 and retard the feed rate through the stations 110, 114. On the other hand, if the feed rate through the station 104 is great the sensor 112 and controller 122 increase the feed rate through the forming stations 110, 114. The sensor 112 is constructed substantially like the sensor 106 and is not described further here. Reference should be made to the description of the sensor 106 if further constructional details of the sensor 112 are required.

THE FORMING STATION 110

Figure 17:
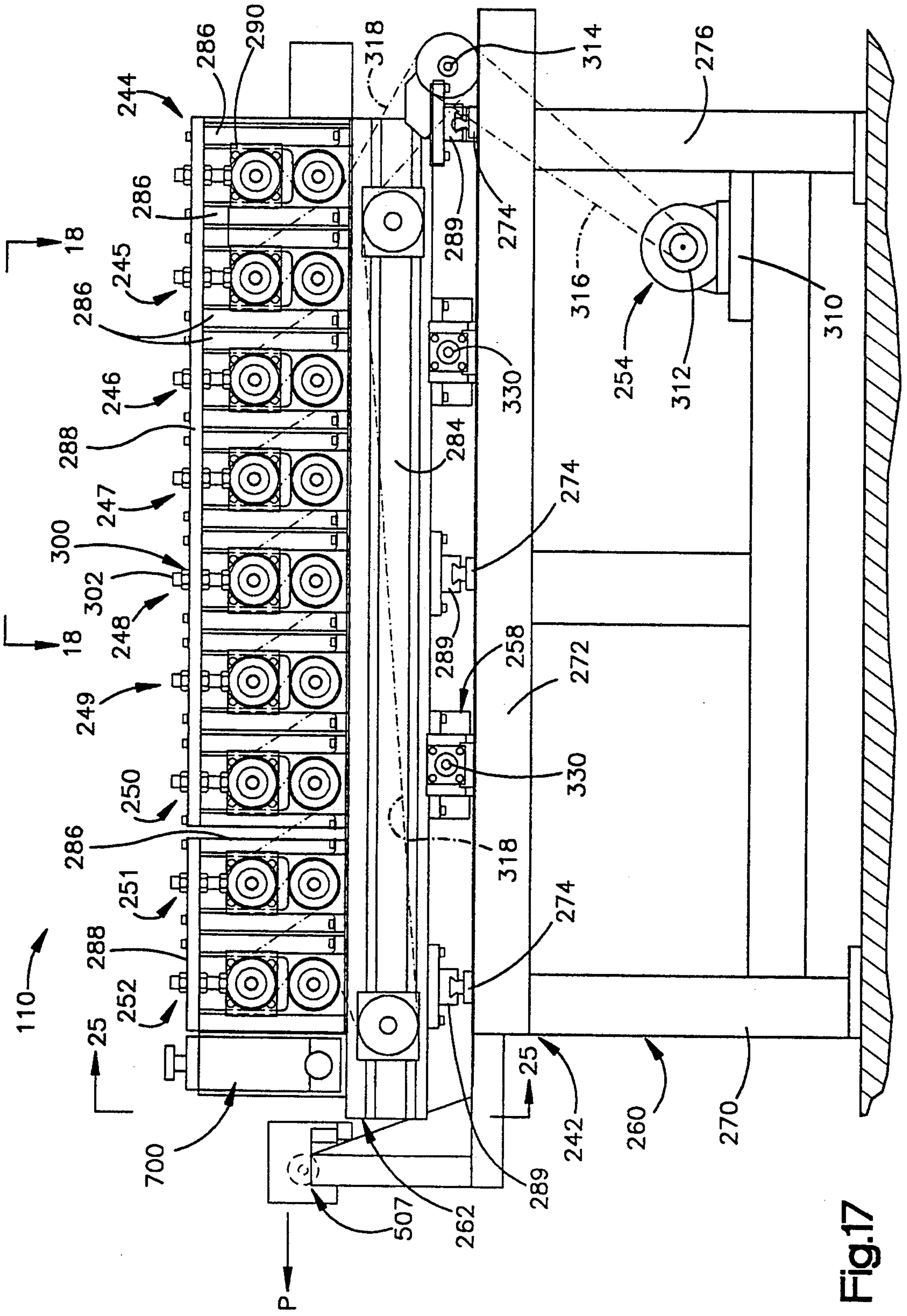
FIG. 17 is an elevational view of part of the production line of FIG. 7.

The forming station 110 (see FIG. 17) is preferably a rolling mill comprising a support frame structure 242, roll assemblies 244–252 carried by the frame structure, a roll assembly drive motor 254, a drive transmission 256 coupling the motor to the roll assemblies, and an actuating system 258 for enabling the station 110 to roll form stock having different widths.

The support frame structure 242 comprises a base 260 fixed to the floor and a roll supporting frame assembly 262 adjustably mounted atop the base 260. The base 260 is positioned in line with the stock path of travel P immediately adjacent the loop feed sensor 112. The roll supporting frame assembly 262 extends along opposite sides of the stock path of travel P with the stock path of travel P extends centrally through the roll supporting assembly.

The base 260 is formed by legs 270, support rails 272 extending along opposite lateral sides of the mill at the upper ends of the legs, transverse beam-like trackways 274 extending between the rails 272 at locations spaced apart along the path of travel P, and a network of stiffening elements (not shown) interconnecting the rails 272, trackways 274 and the legs 270.

Figure 18:
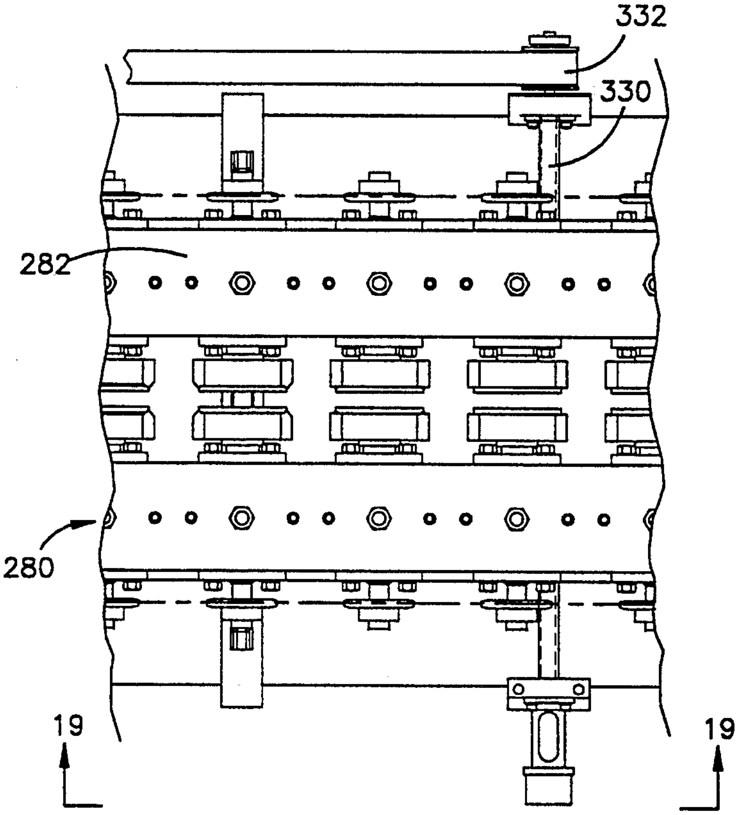
FIG. 18 is plan view seen approximately from the plane indicated by line 18—18 in FIG. 17.
Figure 19:
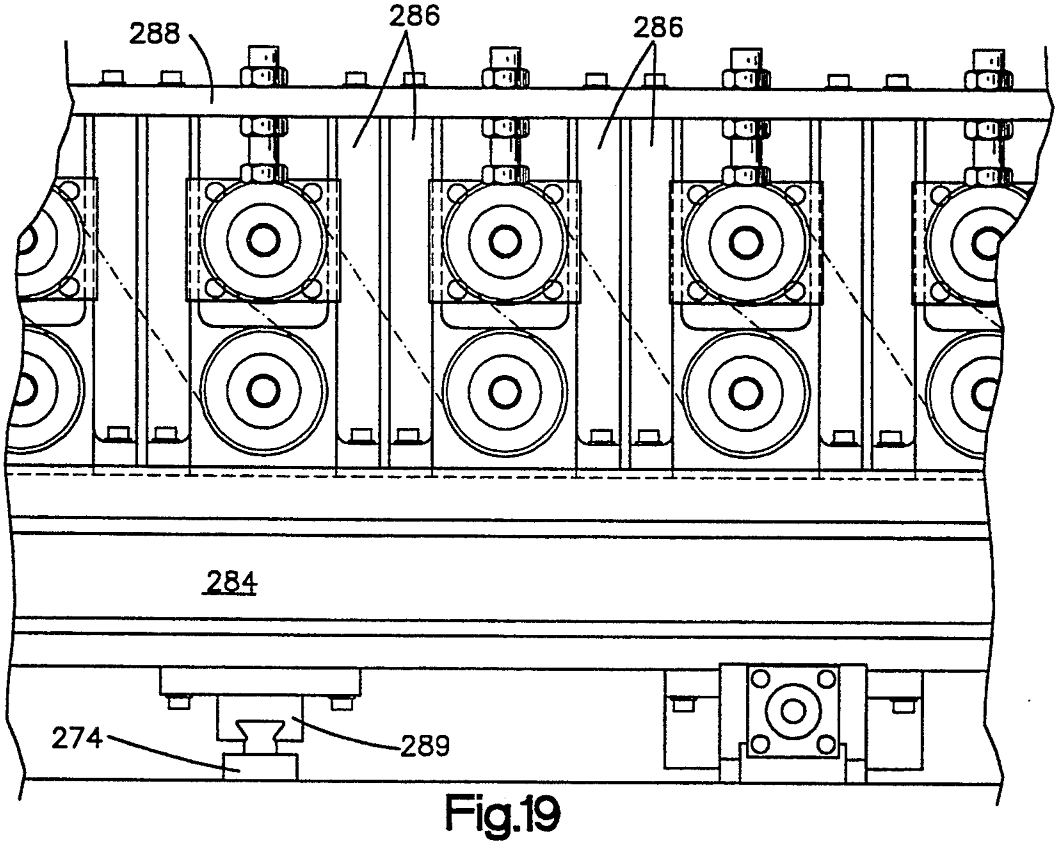
FIG. 19 is a fragmentary elevational view seen approximately from the plane indicated by line 19—19 in FIG. 18.

The roll supporting frame assembly 262 comprises roll support units 280, 282 respectively disposed on opposite sides of the path of travel P. The units 280, 282 are essentially mirror images so only the unit 280 is described in detail with corresponding parts of the units being indicated by like reference characters. The unit 280 (see FIGS. 8, 17 and 18) comprises a lower support beam 284 extending the full length of the mill, a series of spaced apart vertical upwardly extending stanchions 286 fixed to the beam 284, one pair of vertically aligned mill rolls received between each successive pair of the stanchions 286, and an upper support bar 288 fixed to the upper ends of the stanchions. The support bar 288 is illustrated as fixed to the stanchions by heavy machine screws but nuts and bolts could also be used.

Each mill roll pair extends between a respective pair of stanchions 286 so that the stanchions provide support against relative mill roll movement in the direction of extent of the path of travel P as well as securing the rolls together for assuring adequate engagement pressure between rolls and the stock passing through the roll nips. The support beam 284 carries pairs of spaced apart linear bearing assemblies 289 on its lower side each pair of bearing assemblies aligned with and engaging a respective trackway 274 so that the beam 284 may move laterally toward and away from the stock path of travel P on the trackways 274.

Each roll assembly 244–252 is formed by two roll pairs aligned with each other on the path of stock travel to define a single "pass" of the rolling mill. That is to say, the rolls of each pair have parallel axes disposed in a common vertical plane and with the upper rolls of each pair and the lower rolls of each pair being coaxial. The rolls of each pair project laterally towards the path of stock travel from their respective support units 280, 282. The projecting roll pair ends are adjacent each other with each pair of rolls constructed to perform the same operation on opposite edges of the ribbon stock. The nip of each roll pair is spaced laterally away from the center line of the travel path. The roll pairs of each assembly are thus laterally separated along the path of travel.

Each roll comprises a bearing housing 290, a roll shaft 292 extending through a bearing in the housing 290, a stock forming roll 294 on the inwardly projecting end of the shaft and a drive pulley 296 on the opposite end of the shaft which projects laterally outwardly from the support unit. The housings 290 are captured between adjacent stanchions as described above.

The forming rolls 294 are different from conventional mill rolls in that the roll diameters differ by only about 0.001–0.0015 inches from one roll assembly to the next for the first 4 roll assemblies. The roll diameter difference is not sufficient to stretch or otherwise cause dimensional instability of the ribbon stock. Nevertheless the stock is properly tensioned as it proceeds through the rolling mill.

The upper support bar 288 carries a nut and screw force adjuster combination 300 associated with each upper mill roll for adjustably changing the engagement pressure exerted on the stock at the roll nip. The adjuster 300 comprises a screw 302 threaded into the upper roll bearing housing 290 and lock nuts for locking the screw 302 in adjusted positions. The adjusting screw is thus rotated to positively adjust the upper roll position relative to the lower roll. The beam 284 fixedly supports the lower mill roll of each pair. The adjusters 290 enable the mill rolls to be moved towards or away from each other to increase or decrease the force with which the roll assemblies engage the stock passing between them.

The drive motor 254 is connected to the base 260 below the support beams 272 by a bracket 310. The motor 254 is preferably an electric servomotor driven from the controller unit 122. As such the motor speed can be continuously varied through a wide range of speeds without appreciable torque variations. The motor 254 is preferably disposed on its side with its output shaft extending horizontally and laterally relative to the stock path of travel.

The transmission 256 couples the motor 254 to the roll assemblies 244– 252 so that the roll assemblies are positively driven whenever the servomotor is operated. The transmission 256 comprises a motor output shaft and sprocket arrangement 312, a drive shaft 314 disposed laterally across the end of the rolling mill, a drive chain 316 coupling the motor shaft to the drive shaft, and drive chains 318 coupling the drive shaft 314 to the respective roll pairs on each opposite side of the rolling mill. The drive chains 318 are reeved around the drive shaft sprocket and around sprockets on each roll shaft 292 on each side of the machine.

Whenever the motor 254 is driven, the rolls of each roll assembly are positively driven in unison at precisely the same angular velocity. The roll sprockets of successive roll pairs are identical and there is no slip in the chains so that the angular velocity of each roll in the rolling mill is the same as that of each of the others. The slight difference in roll diameter provides for the differences in roll surface speed referred to above for tensioning the stock without distorting it.

The actuating system 258 simultaneously shifts the roll pairs of each roll assembly laterally towards and away from each other so that the stock passing through the rolling mill can be formed into spacer frame members having different widths. The actuating system 258 comprises a pair of right and left hand threaded jackscrews 330 extending between lateral sides of the frame assembly 262, and a drive transmission 332 between the jackscrews. See FIG. 18. The jackscrews are mounted in bearings fixed to the rails 272 with their axes of rotation extending parallel to each other laterally across the rolling mill. The support beams 284 on opposite sides of the path of travel are respectively threaded onto the right and left hand screwjack threads so that when the screw jacks are rotated in one direction the beams and their roll pairs are moved laterally towards each other while jackscrew rotation in the opposite sense moves the roll pairs away from each other. The beams 284 move along the trackways 274 with the aid of the linear bearings 289 during their position adjustment.

The drive transmission 332 is preferably a timing belt reeved around sheaves on the screwjacks. The actuating system 258 is substantially like the actuating system 200 described above. Further details concerning the construction of the actuating system 258 can therefore be obtained from the foregoing disclosure of the system 200.

In the illustrated embodiment of the invention, desiccant bearing fluent material, such as a liquid silicone rubber (LSR), is applied to the frame member by a desiccant extrusion system 340 as it is in the process of being formed in the rolling mill. See FIG. 8. The rolling mill 240 comprises nine roll assemblies for converting the flat ribbon of sheet steel stock into a "C" shaped channel. In the illustrated embodiment of the invention the sixth and seventh roll assemblies are spaced apart in the direction of travel of the stock material and a desiccant extrusion nozzle 342 extends axially between them into the partially formed spacer member between its lateral walls 40, 42 and flanges 46.

The nozzle directs the LSR with entrained particulate desiccant onto the interior of the frame member wall 40 where the LSR adheres and eventually cures. The LSR is formed by mixing two compounds, each contained in a respective drum reservoir 343, 344 adjacent the rolling mill. Each drum is provided with a metering pump so that the liquid contents of each drum can be pumped out for mixing and application. A control valve 345 governs flow of the LSR to the nozzle. The valve 345 is in turn controlled from the unit 122. The valve 345 is actuated so that LSR material is not deposited at frame member locations surround vent openings.

Particulate desiccant is mixed into both drums and thus is pumped to the frame member through the nozzle with the LSR. The LSR cures and adheres to the frame member so the desiccant is properly positioned within the frame member for drying the atmosphere subsequently trapped within the insulating glass unit. Inserting the LSR with its entrained desiccant in the frame member during the rolling process assures that the desiccant can be placed even in frame members which are quite narrow. Although the system 340 is illustrated as associated with the rolling mill at station 110, the system 340 can also be located to apply desiccant at the extrusion station 120 just before sealant is applied to the frame members. Either location for the system 340 is preferred. Moreover, LSR material is not the only substance which can be used as a vehicle for the desiccant. Some hot melt materials, polyisobutylene, polyurethane and others, for example, are also satisfactory for use.

Figure 25:
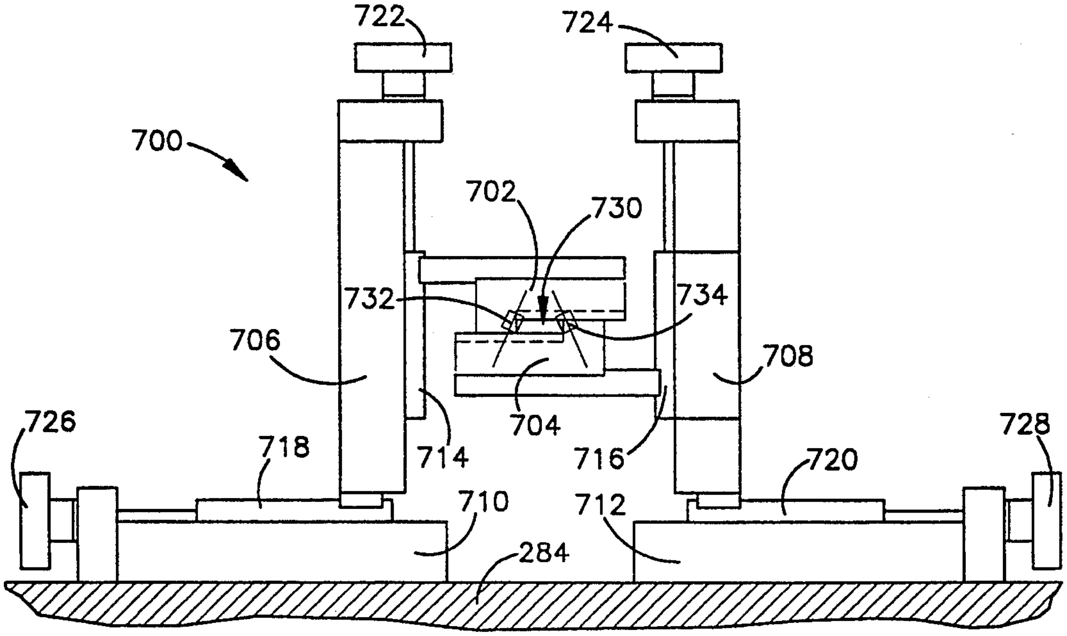
FIG. 25 is an elevational view seen approximately from the plane indicated by line 25—25 in FIG. 17.

A channel straightener 700 is positioned on the support beam 284. See FIG. 17. The channel straightener comprises two horizontal guide members 710, 712. These guide members support two sliding members 718, 720 for horizontal movement relative the support beam 284. See FIG. 25. The position of the sliding members 718, 720 are adjusted by two screws 726, 728. Attached to the sliding members 718, 720 are vertical uprights 706, 708. Housed slidably within and protruding from the vertical uprights are vertical sliding members 714, 716. The position of the vertical sliding members 714, 716 are adjusted by two screws 722, 724. Attached to the sliding vertical members 714, 716 are two mating shoes 702, 704 that form a rectangular opening 730.

Two cam followers 732,734 rotatably coupled to the shoes 702,704 extend into the opening 730 and engage the "C" shaped channel as it enters the opening. These cam followers have axes of rotation oriented at approximately 15 degrees from the vertical. Adjusting the screws 722, 724, 726, 728 changes the height and width of the opening 730. By suitably adjusting the screws and thus the engagement between the cam followers and the channel, twisting or cambering in the "C" shaped channel occurring when the metal strip is bent at the forming station 110 is diminished. This additional channel forming step occurs due to contact between the cam followers and the "C" shaped channel.

THE FORMING STATIONS 114,116

Figure 20:
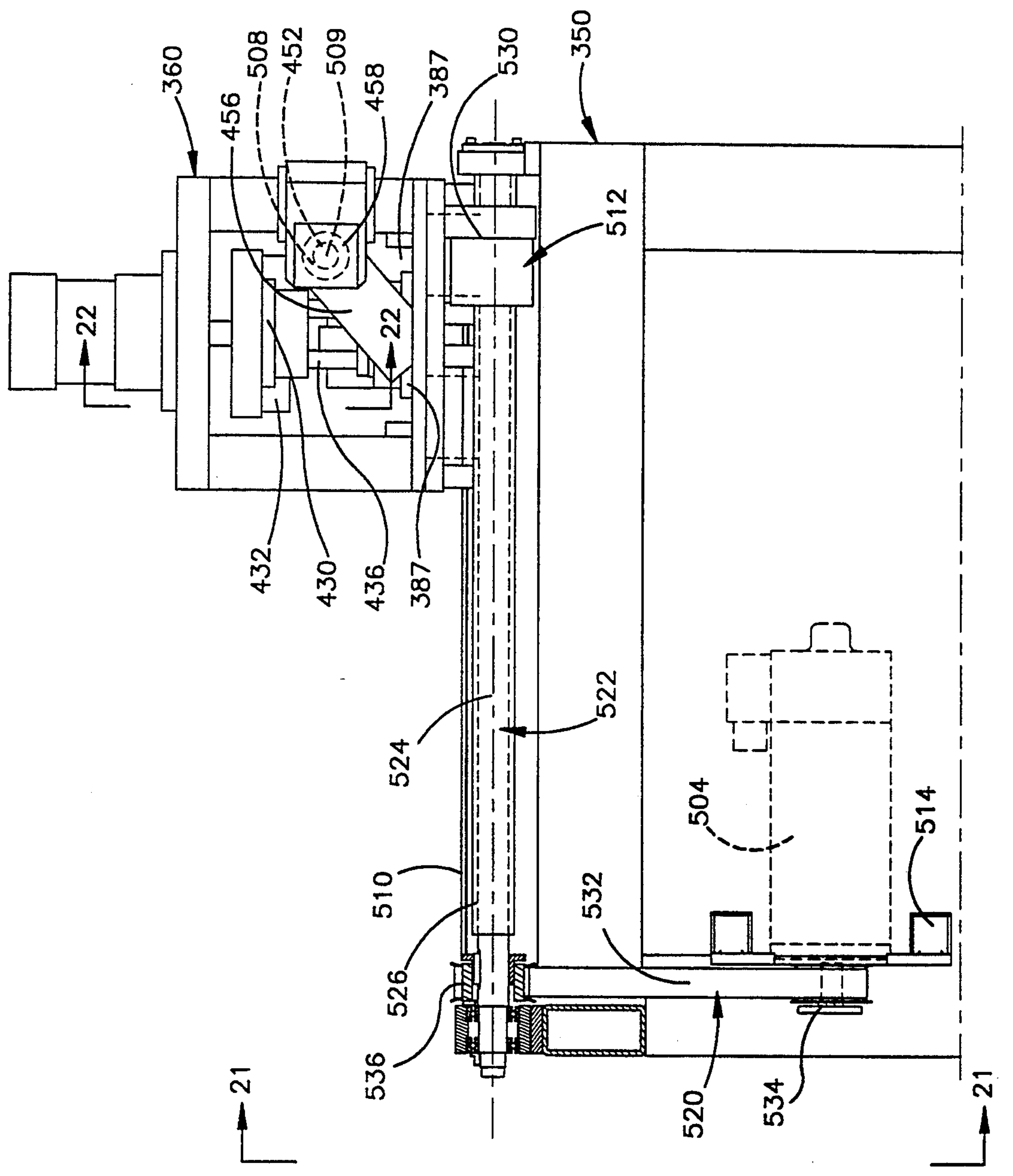
FIG. 20 is an elevational view of a portion of the production line of FIG. 7.
Figure 21:
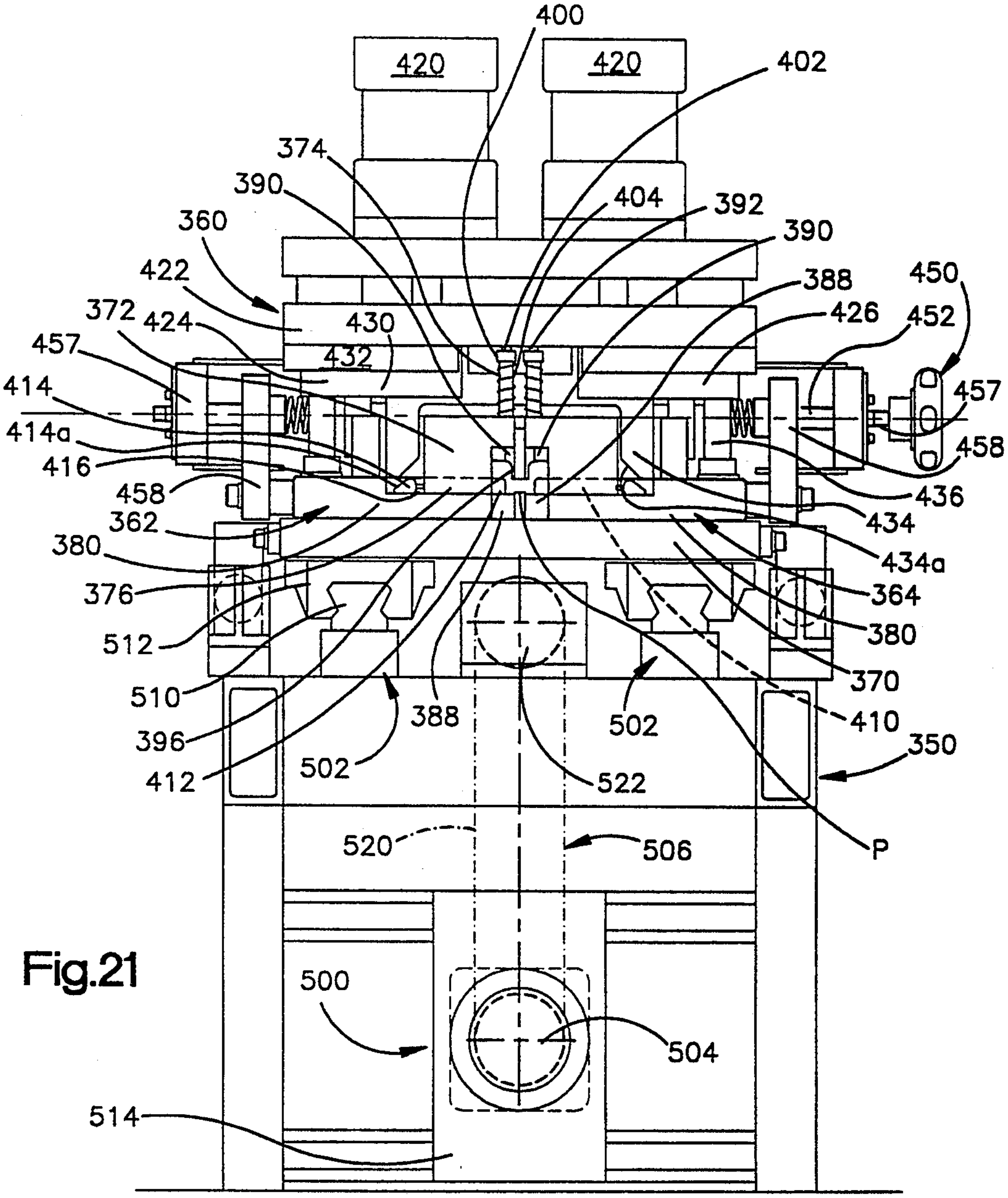
FIG. 21 is an elevational view as seen approximately from the plane indicated by line 21—21 of FIG. 20.
Figure 22:
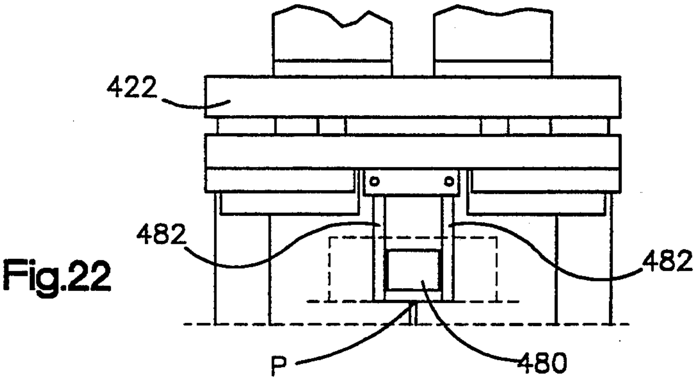
FIG. 22 is an elevation view as seen approximately from the plane indicated by line 22—22 of FIG. 20.

The forming stations 114, 116 are disposed together on a common supporting unit 350. See FIGS. 20–22. The frame members are subjected to a swedging operation at the station 114 and a cut off operation at the station 116. The swedging operation produces the narrowed frame member tongue section which is just narrow enough to be telescoped into the opposite frame end when the spacer frame is being fabricated. The cut off operation is performed between the tip of each frame tongue section and the adjacent trailing end of the preceding frame member. The tongue and trailing end are joined by a short rectangular tang of the stock material which is sheared by the cut off operation.

The swedging station 114 comprises a supporting framework 360, first and second swedging units 362, 364 disposed along opposite sides of the stock path of travel P and an actuator system 366 for the swedging units. The framework 360 is mounted on top of the supporting unit 350 and is comprised of structural members welded together to form an actuator supporting superstructure above the path of stock travel P and a work station bed 370. The bed 370 extends beneath and supports the structural members of the superstructure.

The swedging units are essentially mirror images of each other and therefore only the unit 362 is described in detail. Parts of the unit 364 which are identical to those of the unit 362 are designated by corresponding primed reference characters. The swedging unit 362 engages and deforms one frame member tongue side wall to reduce the span of the tongue. This enables the frame ends to be telescoped into engagement when the frame is being assembled. The unit 362 comprises a swedging body 372 stationed on the bed 370, an anvil assembly 374 carried by the body 372 and a swedging tool assembly 376 supported by the body 372 for coaction with the anvil assembly 374.

The swedging body 372 comprises a plate-like base 380 adjacent one lateral side of the frame member path of travel P, a swedge mount member fixed to the base 380 adjacent the path of travel, and an upstanding stop member which projects away from the base toward the actuator system for limiting the travel of the actuator system as the frame tongue is swedged.

The base 380 is supported on the bed 370 by way forming members 387 (see FIG. 20) so the base position is adjustable laterally toward and away from the path of travel centerline. The base 380 defines a frame guide portion 388 extending under the side of a frame member moving along the path of travel P through the swedging station. The guide portion 388 supports the frame member on the travel path during swedging. The base member position adjustment shifts the guide portion 388 to accommodate different width frame members.

The swedge mount member is rigidly fixed to the base 380 and projects upwardly. The member supports the anvil assembly for vertical movement to and away from a frame member being swedged and supports the swedging tool assembly 376 for horizontal motion into and away from engagement with the frame member.

The anvil assembly 374 is positioned to support and engage the tongue side wall at the conclusion of the swedging operation to define the tongue side wall shape. The anvil assembly 374 comprises an elongated anvil member 390 and a pair of actuator rod assemblies 392 supported by the body 372 for transmitting movement from the actuator system 366 to the anvil member.

The anvil member 390 has an elongated blade-like projecting element 396 extending downwardly for engagement with the frame member. The lengths of the anvil member 390 and blade portion 396 correspond to the length of the frame member tongue wall so that the element 396 coextends with the tongue and for supporting the tongue wall throughout its length during swedging.

The actuator rod assemblies 392 force the anvil member 390 into engagement with the frame member during swedging and withdraw the anvil member from the frame member when swedging is completed. The rod assemblies 392 are spaced apart in the direction of the frame member path P with each projecting through a bore in the swedging member 372. The rod assemblies are identical and therefore only one is illustrated and described.

The rod assembly 392 comprises a rod member 400 and a pair of opposed helical compression type springs 402, 404 for reacting against the rod member. When the anvil 374 is retracted from its swedging position the springs oppose each other so the rod assembly lightly engages the actuator assembly. When the rod assembly is actuated toward its swedging position the spring 402 is compressed to a predetermined height at which time further compression is blocked and the spring 404 acts solely to resiliently resist movement of the rod assembly to the swedging position. After swedging the spring 404 forces the rod assembly away from the swedging position.

The swedging tool assembly 376 comprises an elongated tool body 410 extending through a horizontal guide opening in the swedge mount member, a hardened swedging nose element 412 fixed to the end of the body 410 adjacent the travel path P, an actuating cam element 414 adjacent the opposite end of the body 410 and a force limiting spring 416 interposed between the cam element and the body 410.

The cam element 414 has a wedge-like face 414*a* which is engaged by a complementary wedge face of the actuator system to force the tool assembly to swedge the frame tongue. The actuating force serves to compress the spring 416 as the tool body 410 and the nose element 412 move to engage the frame side wall. The spring 416 is designed so that it does not reach its compression limit at any time during swedging of any size frame member, thus assuring that excessive swedging force is not applied to the frame wall or to the anvil assembly.

The nose element 412 is constructed to match the length of the anvil blade-like element so that the swedging procedure is completed with the nose element and the blade-like element confronting along their lengths with the frame side wall clenched between them. After swedging, the nose element 412 projects slightly from the swedge mount member to provide a lateral guide for frame members passing along the path P.

The actuator system comprises a pair of pneumatic rams 420 attached to the framework 360 above the cut off and swedging stations, an actuator platen 422 fixed to the rams for vertical reciprocating motion when the rams are operated, and actuating cam assemblies 424, 426 supported by the platen for operating the swedging station.

The cam assembly 424 operates the swedging unit 362 and comprises a plate-like body 430 carried on the platen 422 by way forming members 432 which enable lateral adjusting movement of the body 430 relative to the travel path P, a camming member 434 projecting from the body 430 toward the swedging unit 362, and guide rods 436 fixed in the body 430 and projecting downwardly through bushings and receiving openings in the base 380.

The lower end of the camming member defines a wedge face 434*a* which coacts with the wedge-like face 414*a* on the cam element. The downward travel of the camming member 434 is the same regardless of how wide the frame member in the swedging unit might be. The camming member travel is limited by the stop member and the force limiting spring 416 assured that excessive swedging force is not applied.

The opposed swedging and actuator parts are movable laterally towards and away from the path of travel P by an actuating system 450 to desired adjusted positions for working on stock of different widths. The system 450 firmly fixes the opposed parts at their laterally adjusted locations for further frame production. As noted, the opposed parts are supported in ways extending transverse to the direction of extent of the travel path P. The actuating system 450 shifts the opposed parts simultaneously along the respective ways between adjusted positions.

The preferred and illustrated actuating system 450, like the system 200 described above, provides extremely accurate information regarding placement relative to the stock path of travel P. The system 450 comprises a single right and left hand threaded jackscrew 452 extending between lateral sides of the framework 360 and a swedging unit drive member 456, 457 driven by the jackscrew and rigidly linking the jackscrew to the opposed parts.

The jackscrew 452 is mounted in bearing assemblies 458 connected to lateral side frames forming part of the framework 360. The jackscrew is threaded into the swedging unit drive members 456, 457. The member 456 is threaded onto jackscrew threads having one hand while the member 457 is threaded onto jack screw threads having the opposite hand. Thus, when the jackscrews rotate in one direction the driving members 456, 457 force their associated swedging units to shift laterally away from each other relative to the stock path of travel P. Jack-screw rotation in the other direction shifts the assemblies toward each other relative to the path of travel. The threads on the jackscrews are precisely cut so that the extent of lateral movement is precisely related to the angular displacement of the jackscrews creating the movement. The actuating cam assemblies are moved by the swedging unit assemblies via the guide rods 436 when the lateral positions are adjusted.

The angular position of the jackscrew is measured and displayed by a suitable indicator (not shown) positioned where it can be read by the operator. In the preferred embodiment a digital encoder (not illustrated) is associated with the jackscrew. The encoder is coupled, via the controller unit 122, to a digital display mounted on the framework adjacent the handwheel so the operator can precisely control the lateral position of the swedging unit assemblies.

The cut-off unit is located axially adjacent the swedging unit in the direction of frame member travel along the path P. See FIG. 22. The cut-off unit comprises an elongated cut-off blade 480 extending in a plane transverse to the direction of the travel path P and a pair of blade supporting rods 482 fixed to the platen 422 at their upper ends and fixed to the blade 480 at their lower ends. The blade 480 is laterally wider than the widest frame member passing through the unit and extends into vertically oriented slots formed in the swedge mount members 382 on opposite sides of the path P. The swedge mount member slots are sufficiently wide that they accommodate and guide the blade 480 regardless of the adjusted swedge mount member positions relative to the centerline of the path P.

The actuator system operates the swedging unit at the same time the cut-off unit is operated. Accordingly, when the tongue at the leading end of a frame member is being swedged the preceding frame member is cut-off from the stock and is free to move from the forming stations 114, 116 to the extrusion station 120.

In the illustrated and preferred embodiment the forming stations 114, 116 perform their operations without requiring that the stock moving along the travel path P be stopped or slowed down. This is accomplished, in the preferred embodiment, by reciprocating the bed 370 carrying the stations 114, 116 relative to the supporting unit 350 in the direction of the path of travel so that the swedging and cut-off operations are performed on the stock moving along the path. The bed and stations are normally at a "home" position illustrated in the drawings. When a tongue location on the stock passes into the stations the bed is accelerated and driven along the travel path P. The stations 114, 116 catch up to the tongue location. When the stock and the stations 114, 116 are aligned and travelling at the same speed, the stock is swedged and cut-off. After that the bed and stations return to the home position and remain stationary until another tongue structure is sensed.

The reciprocating motion is imparted to the stations by a station driving system 500 comprising a linear bearing mechanism 502 supporting the bed 370 for reciprocation on the unit 350 in the direction of the path P, a drive motor 504 controlled from the controller 122 and stationed on the supporting unit 350, a transmission 506 coupling the bed 370 to the motor 504, and stock sensors 507, 508 and 509 for producing signals for governing the speed and direction of the forming station movement by the controller unit 122.

The linear bearing mechanism 502 comprises parallel trackways 510 fixed to the support unit 350 and extending throughout the length of the unit 350 parallel to the travel path P and bearing ball assemblies 512 connecting the support bed 370 to the trackways 510. The trackways 510 are each formed with longitudinally extending bearing ball grooves. The assemblies 512 are fixed to and project downwardly from the bed 370. The assemblies 512 fit onto the trackways and contain bearing balls which roll in the trackway ball grooves. The assemblies 512 are constructed do that the bearing balls recirculate within the assemblies as they move with respect to the path P. The bearing assemblies 512 assure low friction support of the bed 370 on the support unit 350. The linear ball bearing construction is commercially available and therefore is not described further here.

The drive motor 504 is connected to the support unit 350 below the bed 370 by a bracket 514. The motor 504 is preferably an electric servomotor driven from the controller unit 122. The motor speed can be continuously varied through a wide range of speeds without appreciable torque variations and the motor starting torque is sufficient to rapidly accelerate the bed 370 and associated equipment from a stationary condition. Moreover, the angular displacement of the motor shaft is monitored by the controller unit 122. This is accomplished, in the illustrated embodiment, by attaching a digital encoder (not shown) to the motor shaft so that the encoder output can be transmitted to the controller unit 122. The motor 504 is preferably disposed on its side with its output shaft extending horizontally and parallel to the stock path of travel.

The transmission 506 comprises a belt drive 520 and a ball screw drive 522 which inelastically transmit motion from the output shaft of the motor 504 to the bed 370 without slip. The ball screw drive 522 comprises a screw member 524 mounted in bearings at opposite ends of the support unit 350 for rotation about an axis extending parallel to and between the trackways 510. The screw member 524 has a threaded central section 526 extending substantially between the bearing locations. The threaded section 526 extends into a conforming thread forming structure of a driving member 530 fixed to and projecting downwardly from the bed 370. The driving member thread forming structure comprises bearing balls which run in the threads of the screw member 524 so that the screw member 524 positively drives the driving member 530 along its length upon screw member rotation while the frictional forces resisting relative motion between the screw member and the driving member are minimized by the bearing balls.

The belt drive 520 comprises a timing belt 532 and lugged pulleys 534, 536 connected, respectively, to the motor shaft and the screw member 524 by suitable key arrangements. The belt 532 is reeved around the pulleys and is so constructed and arranged that the transmission of motion between the motor shaft and the screw member occurs without slip, stretching or resilient elongation and contraction.

The stock sensors 507, 508 and 509 coact with the controller unit 122 so that the swedging and cut-off operations are performed precisely where required on the stock moving along its path of travel P regardless of the stock feeding speed produced by the rolling mill and even when the stock is accelerating or decelerating. The sensor 507 is positioned immediately adjacent the rolling mill exit (see FIG. 17) and comprises a roller firmly and positively engaging the stock emerging from the rolling mill. The roller is attached to a digital encoder whose output is transmitted to the controller 122. The encoder output indicates, precisely, the movement of the stock into the swedging and cut-off stations because the angular displacement of the roller about its axis corresponds exactly to the linear displacement of the stock which creates the angular displacement. This enables precise tracking and locating of a given point on the stock passing through the swedging and cut-off stations as well as the velocity and acceleration of the point.

The sensors 508, 509 cooperate to detect the presence of a unique stock location passing the location of the sensors 508, 509. The sensor 508 is disposed above the travel path P near the entrance of the swedging and cut-off stations and directs a light beam onto the stock centerline. The reflected beam is detected except when one of the punched holes moves beneath the sensor location at which time the sensor 508 produces an output signal to the controller 122. The signal from the sensor 508 is ineffective to produce a response in the absence of a contemporaneous output signal from the sensor 509.

The sensor 509 is positioned with the sensor 508 near the entrance to the swedging and cut-off stations. The sensor 509 optically detects the presence of a corner notch shape in the stock. The sensor 509 directs a beam toward a location spaced laterally from the centerline of the travel path P where the 45° angle corner notches in the stock pass. The sensor 509 produces an output signal whenever a corner notch passes near its location but these signals are ineffective without the signal from the sensor 508.

The sensors 508, 509 both produce output signals only when the frame tongue structure is moving past the sensor location. When this occurs the controller 122 energizes the motor 504 and drives it to accelerate the bed 370 away from its home position in the direction of travel of the stock. The bed 370 is rapidly accelerated so that the sensors 508, 509 are moved with the bed 370 and catch up with the frame tongue construction on the stock. The sensors 508, 509 again recognize the tongue construction and signal the controller 122. At this point the controller 122 has information from the motor 504 and the stock sensor 507 which precisely locate both the tongue construction and the bed 370. The motor 504 is slowed until the stations 114, 116 are precisely aligned with the tongue construction on the stock (a fact which is determined from the encoder outputs from the motor 504 and the sensor 507). The stations are immediately operated to swedge the tongue, cut-off the preceding frame member and return to the home position.

The frame member which is cut off from the stock is received on a conveyor unit 520 and moved to the extrusion station at relatively high speed. The conveyor is quite long compared to the length of the longest spacer frame member fabricated by the production line 100. Thus, even the longest spacer frame member 16 cut off from the stock accelerates away from the cut-off station 116 on the conveyor 520. This assures adequate separation of frame members entering the extrusion station 120 regardless of their length. The conveyor 520 is preferably a belt conveyor and may be of any suitable or conventional type and is therefore not described in further detail.

The extrusion station 120 receives cut off frame members from the conveyor 520 and feeds them endwise to a sealant applying nozzle location where sealant is applied with the frame member in its unfolded "linear" condition. After the sealant is applied the frame member is folded to its finished rectangular configuration, the ends telescoped and the assembly completed as described. The extrusion station is formed primarily by a conventional commercially available extruder 540 which may be any of several types available from Glass Equipment Development, Inc., Twinsburg, Ohio. The following types of extruders can be used, depending on the type of sealant desirable for use: HME-55-PHE-L; HME-50-PE-L; SE-116-PHE-L; and SE-216-PHE-L. The illustrated production line 100 utilizes a hot melt type sealant which is supplied from a conventional commercially available hot melt reservoir and pump system 542 (see FIG. 8) such as a Graco/Pyles (#2601-616) system available from Graco/Pyles, Wixom, Mich. Other systems are available. The extruder and hot melt reservoir-pump unit are not described further for the reasons given.

Figure 23:
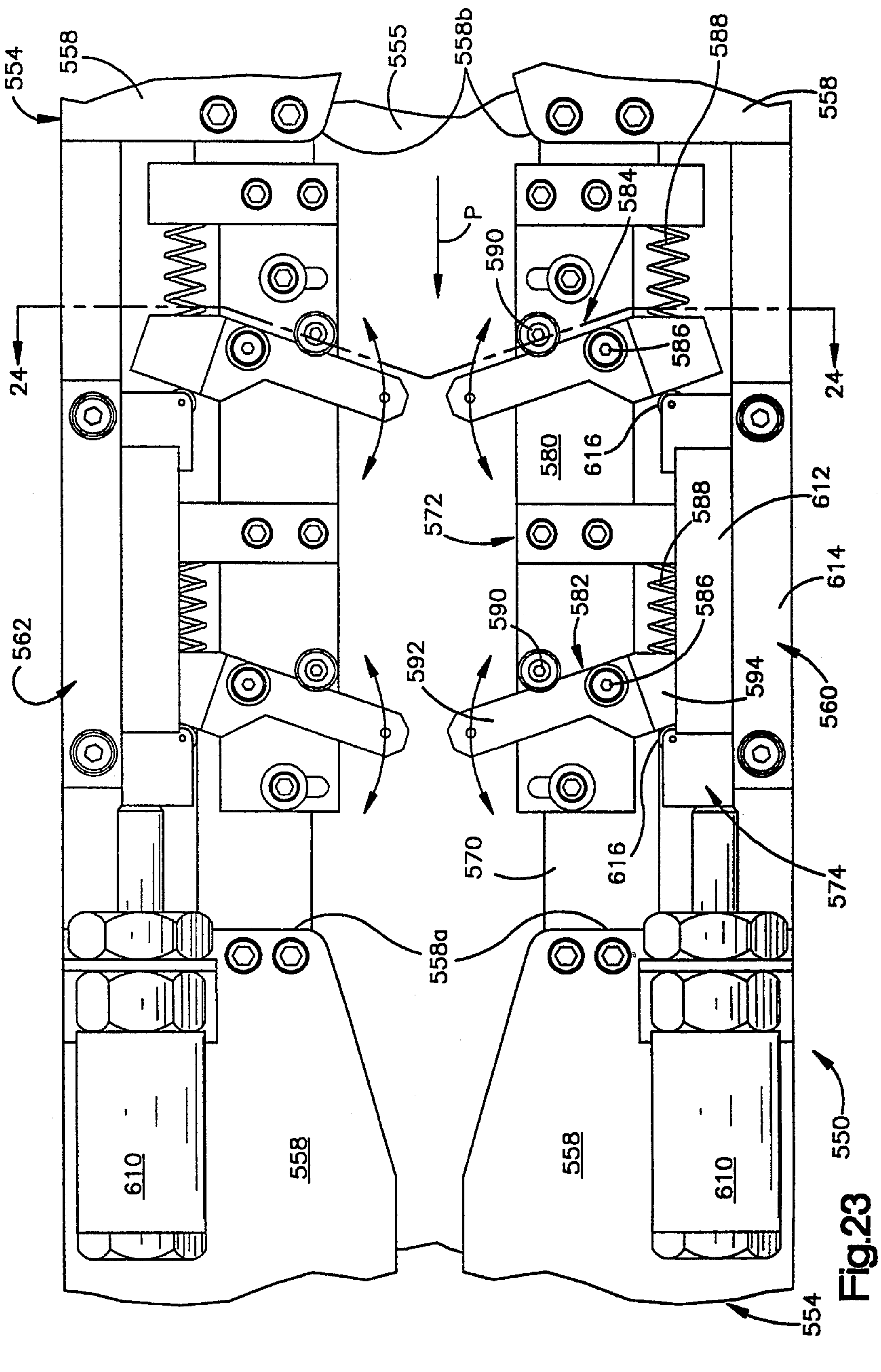
FIG. 23 is an enlarged fragmentary plan view seen approximately from the plane indicated by line 23—23 in FIG. 7; and, FIG. 24 is a cross-sectional view seen approximately from the plane indicated by line 24—24 in FIG. 23.
Figure 24:
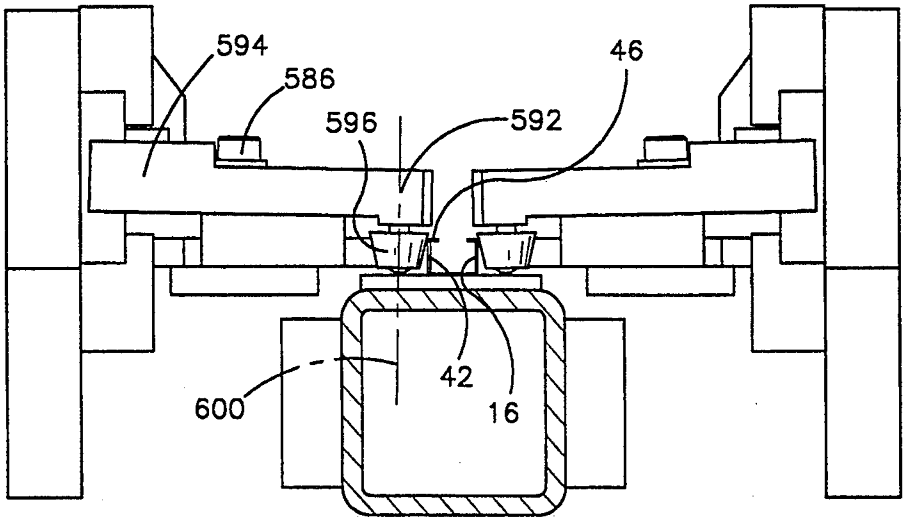

The illustrated conventional extruder 540 is modified to include a frame member crimping unit 550 (see FIGS. 8, 23 and 24) which strikes each corner structure of each frame member entering the extrusion station 120 to deform the corner structures inwardly and assure that the corner structure pleats are deformed inwardly when the frame member is folded. The crimping unit 550 is assembled to a frame member guide mechanism 554 associated with a conveyor belt 555 for feeding frame members to the sealant nozzles. The guide mechanism 554 is essentially conventional in that it has elongated frame member guide plates 558 disposed on opposite sides of the travel path P along the belt 555. The bars are connected by a pantograph linkage (not shown) which permits their adjustment towards and away from the path P while remaining parallel to each other. This type of guide mechanism is incorporated in the conventional systems referred to above.

The illustrated guide mechanism is modified to receive the crimping unit 550 in that the guide plates 558 on each side of the path P are interrupted and the crimping unit is rigidly attached between the guide plate ends illustrated at 558*a* and 558*b*. The crimping unit 550 is formed by separate crimping mechanisms 560, 562. The mechanisms 560, 562 are essentially mirror images, are disposed on opposite sides of the path P and operate in the same way at the same time. Accordingly only the mechanism 560 is described in detail.

The crimping mechanism 560 is formed by a supporting body 570 bolted to the frame guide plate ends at its opposite ends, a crimping finger assembly 572 supported on the body 570 and a crimping assembly actuator mechanism 574 for controlling operation of the crimping assembly.

The crimping finger assembly 572 comprises a base plate 580 bolted to the body 570, identical crimping finger units 582, 584 spaced apart in the direction of the path P, a pivot 586 connecting each finger unit to the base plate for rotation about the central axis of the pivot, a spring 588 engaging each finger unit for biasing the unit toward the path P and engagement with a frame member on the belt, and a stop element 590 fixed to the plate for limiting movement of the finger unit by the spring.

The finger unit 582 comprises an elongated finger element having a slender elongated section 592 projecting from the pivot 586 toward the path P, an enlarged end 594 at the opposite end of the finger element and a roller 596 (see FIG. 24) mounted at the projecting end of the section 592. The roller 596 extends downwardly from the section 592 for engagement with frame members on the path. The roller 596 is rotatable about an axis 600 which is slightly skewed from vertical. The axis 600 is skewed slightly from vertical because the base plate 580 is slightly wedge-shaped in cross section in the finger units and tilt slightly downwardly when they project toward the centerline of the travel path P. In addition, the roller 596 has a frustoconical upwardly divergent shape. Accordingly, engagement between the roller and the frame member 16 is primarily along a line of contact at the juncture of the side wall 42 and the associated stiffening flange 46.

The spring 588 in the illustrated embodiment is a helical compression spring which engages its finger element end 594 for urging the projecting section with its roller 596 toward a position where the finger unit projects maximally into the path P and engages the stop element 590. When a frame member is on the path P the finger unit engages the frame member as described and remains spaced away from the stop element 590. As such, the spring 588 acting on the finger element end 594 forces the roller 596 to ride firmly against the frame member as the frame member passes.

When the roller reaches a frame corner construction the abrupt end of the stiffening flange created by the corner notch 50 leaves the roller momentarily unsupported. The unresisted spring force accelerates the roller toward the travel path centerline resulting in the roller impacting against the weakened zone 52. The impact of the roller on the weakened zone 52 yields the side wall material so that it is deformed inwardly, or "dimpled." The roller continues to roll along the frame corner structure and out onto the side wall again as the frame member continues to move.

It should be noted that the dimple formed by the roller impact is deepest at the location where the zone is weakest, i.e., where the deepest score line was formed. Thus the dimples at a given frame corner structure are not symmetrically formed. See FIG. 3.

When the frame member has passed through the crimping mechanism each finger unit is urged by its respective spring toward its maximally extended position. The rollers project so far into the path P that possible damage to a succeeding frame member could be caused by a collision with the rollers. The actuator mechanism 574 retracts the crimping finger units before each frame member arrives at the crimping mechanism location to avoid collisions between the frame member leading ends and the rollers.

The actuator mechanism 574 comprises a pneumatic ram 610 supported on the guide plate 558, a slide member 612 actuated by the ram, a way structure 614 supporting the slide member, and cam rollers 616 connected to the slide member for engaging and shifting the crimping finger units about their pivot axes. When the ram is extended the slide member advances toward the finger units and the cam rollers 616 force the finger units to rotate about their pivot axes against the force of the associated spring. This withdraws the finger units from the path P. The ram is retracted when a frame member leading end has passed the crimping station. The corner structure at the base of the frame tongue does not require crimping because the swedging operation yields that corner inwardly. Operation of the ram is preferably controlled by an optical position sensor, not shown, of conventional construction.

The frame members 16 proceed to the sealant applying nozzles where the sealant body 18 is applied. Afterward, the frame member is bent to its final rectangular shape and fabrication of the spacer assembly is completed. It should be appreciated that operating control of the production line is closely monitored and exercised by the controller unit 122. In this regard, it is noted that the controller unit 122 is capable of directing a production run of randomly different length frame members (in which a relatively long frame member can be followed immediately by a relatively short frame member) by controlling the speed of operation of the various forming stations and the ribbon stock accumulations. This is important in maximizing the rate of production of "made" to order IGUs which are, by their nature, not of uniform size.

While a single embodiment of the invention has been illustrated and described in detail, the present invention is not to be considered limited to the precise construction disclosed. Various modifications, adaptations and uses of the invention may occur to those skilled in the art to which the invention relates. The intention is to cover all such modifications, adaptations and uses falling within the scope or spirit of the claims.

Having described my invention, I claim:

1. A method of making a spacer frame assembly comprising:

a) providing a supply of thin relatively narrow sheet metal stock;
b) feeding the stock endwise to a forming station;
c) forming the stock at said forming station to define a rigid linearly extending frame element having opposite side walls and a base wall;
d) severing said frame element to form a spacer frame member having a leading end and a trailing end;
e) altering the size of one spacer frame element end to change the dimension between said opposite side walls sufficiently that said spacer frame element ends can be telescoped together;
f) applying sealant material to external surface areas of said frame element;
g) thereafter bending the frame element and sealant material to form a polygonal shape; and,
h) telescoping said spacer frame ends together.

2. The method claimed in claim 1 wherein altering the size of said one frame element end comprises feeding said frame element along a path of travel from the forming station to the location where sealant is applied while altering the size.

3. The method claimed in claim 1 further including the steps of forming spacer frame corner structures which permit bending the frame element and deforming the corner structures to facilitate bending the frame element.

4. The method claimed in claim 3 wherein deforming the corner structures comprises impacting the frame element side walls.

5. The method claimed in claim 3 further comprising forming stiffening flanges on said side walls at said forming station and wherein forming said corner structures comprises notching said stock material for interrupting said stiffening flanges at the corner structure locations.

6. The method claimed in claim 1 wherein forming said stock at said forming station further comprises forming a stiffening flange on each of said side walls.

7. In a method of making a spacer frame assembly:

a) providing a supply of thin relatively narrow sheet metal stock;
b) feeding the stock endwise to a forming station;
c) forming the stock at said forming station to define a rigid linearly extending frame element having opposite side walls and a base wall;
d) severing said frame element to form a spacer frame member having a leading end and a trailing end;
e) altering the size of one spacer frame element end to change the dimension between said opposite side walls sufficiently that said leading and trailing spacer frame element ends can be telescoped together;
f) feeding said spacer frame member to a sealant applying station and applying sealant material to external surface areas of said side walls;
g) bending said spacer frame member at corner locations to form a generally polygonal shaped frame; and,
h) telescoping said spacer frame member ends together.

8. The method of claim 7 wherein each of said opposite side walls has a projecting sidewall edge and further comprising forming a stiffening flange on each of said opposite side walls including the step of rolling the projecting sidewall edges towards each other to extend generally parallel to the base wall.

9. The method claimed in claim 8 further including the step of notching the stock so that the stiffening flanges are interrupted at the corner locations.

10. The method claimed in claim 9 wherein said notching step is performed before said stock is fed to said forming station.

* * * * *